(12) United States Patent
Park et al.

(10) Patent No.: US 12,360,554 B2
(45) Date of Patent: Jul. 15, 2025

(54) FLEXIBLE DISPLAY DEVICE

(71) Applicant: LG ELECTRONICS INC., Seoul (KR)

(72) Inventors: Jin Woo Park, Seoul (KR); Min Chul Shin, Seoul (KR); Hang Seok Kim, Seoul (KR); A Ra Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 322 days.

(21) Appl. No.: 18/014,029

(22) PCT Filed: Jul. 24, 2020

(86) PCT No.: PCT/KR2020/009824
§ 371 (c)(1),
(2) Date: Dec. 30, 2022

(87) PCT Pub. No.: WO2022/019364
PCT Pub. Date: Jan. 27, 2022

(65) Prior Publication Data
US 2023/0288955 A1 Sep. 14, 2023

(51) Int. Cl.
*G06F 1/16* (2006.01)
(52) U.S. Cl.
CPC .......... *G06F 1/1624* (2013.01); *G06F 1/1652* (2013.01)

(58) Field of Classification Search
None
See application file for complete search history.

(56) References Cited

U.S. PATENT DOCUMENTS

2006/0186302 A1  8/2006  Jurja

FOREIGN PATENT DOCUMENTS

| KR | 10-2001-0030842 A | 4/2001 | |
|---|---|---|---|
| KR | 10-2010-0080639 A | 7/2010 | |
| KR | 10-2017-0056771 A | 5/2017 | |
| KR | 10-2019-0117985 A | 10/2019 | |
| WO | WO-2022030668 A1 * | 2/2022 | .......... G06F 1/1624 |

* cited by examiner

*Primary Examiner* — Xanthia C Relford
(74) *Attorney, Agent, or Firm* — Birch, Stewart, Kolasch & Birch, LLP

(57) ABSTRACT

A flexible display device is disclosed. The flexible display device comprises a first body, a second body, a flexible display, a ball module, and rails. The ball module includes a case and a plurality of moving balls. The moving balls are inserted into circulation paths of the case and arranged to be movable along the circulation paths, and some of the moving balls are in contact with sliding grooves of the rails. The case may be fixed to the first body, and the rails may be fixed to the second body. When the second body moves in parallel to a first direction with respect to the first body, the moving balls in contact with the sliding grooves roll and move along the circulation paths, such that slippage and friction generated on the ball module can be reduced, and the second body can move smoothly.

20 Claims, 20 Drawing Sheets

FLEXIBLE DISPLAY DEVICE

CROSS REFERENCE TO RELATED APPLICATIONS

This application is the National Phase of PCT/KR2020/009824 filed on Jul. 24, 2020, which is hereby expressly incorporated by reference into the present application.

TECHNICAL FIELD

The present disclosure relates to a device including a flexible display and, more particularly, to a portable device including a flexible display characterized in that the size of the device is changed as two bodies slide with respect to each other.

BACKGROUND ART

Various devices using a flexible display that can be bent while displaying image information have been developed and introduced.

Such a flexible display has been applied to mobile terminals such as mobile phones, smart phones, etc., and users can carry such mobile terminals and use them in various places.

Representative examples of mobile devices to which a flexible display is applied are as follows.

Firstly, research and development has been underway for foldable devices having a structure in which a flexible display is applied to two bodies that are connected to each other by a folding structure (e.g., by a hinge). In such foldable devices, since the flexible display may be disposed to completely cover the two bodies and the folding structure, a relatively large-sized display can be implemented in the devices.

As another example of devices using a flexible display, rollable devices having a structure in which a display is rolled up and unrolled have been studied and developed. In such rollable devices, as the flexible display is rolled, the total size or area of the entire display can be reduced. On the contrary, as the flexible display is unrolled, the total size or area of the entire display can be increased.

As still another example of devices using a flexible display, there are devices in which as two bodies slide with respect to each other, a flexible display having a U-shape due to a curved middle portion thereof is deformed such that the surface area of the flexible display seen from one side thereof changes.

In the device in which the flexible display is deformed as two bodies slide with respect to each other, in order to ensure that the flexible display is deformed as intended, equal forces must be applied on the symmetrical left and right sides of the flexible display, and it is required to minimize friction (i.e., kinetic friction) that occurs between the two bodies when the two bodies slide with respect to each other.

If one of the two bodies fails to accurately move in an intended direction with respect to the other body, damage may occur to the flexible display. Therefore, each of the two bodies must move accurately in an intended direction.

DISCLOSURE

Technical Problem

The present disclosure describes a flexible display device in which when a flexible display is deformed while two bodies move relatively to each other (slidably move), portions connecting two bodies are in rolling-contact with each other to remarkably reduce slip and friction which occur upon the relative movement.

The present disclosure described a flexible display device in which in a device in which the flexible display is deformed while two bodies relatively move to each other (slidably move), a component mediating relative movement of two bodies is formed at a border, such a component can be minimized from being exposed to the outside of the device.

The present disclosure described a flexible display device in which in the device in which the flexible display is deformed while two bodies relatively move to each other (slidably move), each body can accurately move in an intended direction while being tilted.

Technical Solution

According to one aspect of the present disclosure, the flexible display device may be formed to be gripped and carried by a user. That is, the flexible display device may be formed to have approximately the same size, the same shape, and the same weight as general mobile terminals.

In some embodiments, the flexible display device may include a first body, a second body, and a flexible display.

The second body may be formed to move relative to the first body in a direction parallel to a first direction.

The second body may reciprocate between a first position and a second position in the direction parallel to the first direction, relative to the first body. The first position may be a relative position of the second body with respect to the first body, and the second position may also be a relative position of the second body with respect to the first body.

When the second body is in the first position relative to the first body, it can be said that the flexible display device is in a first state, and when the second body is in the second position relative to the first body, it can be said that the flexible display device is in a second state. Accordingly, in the description of the present disclosure, "the first position" may be used in the same sense as "the first state of the flexible display device," and "the second position" may be used in the same sense as "the second state of the flexible display device."

The direction from the first position toward the second position is the first direction.

The second body may include a support.

The support may be formed along a second direction, which is a direction orthogonal to the first direction.

The support may be formed in the shape of a roller that is rotatable about a rotational axis extending in the second direction. That is, the support may be rotatably coupled to the second body.

The flexible display may include a first region and a second region.

The first region may be a region of the flexible display that is coupled to the first body. The first region may be fixedly coupled to the first body.

The first region may be fixed in front of the first body to face forward. The first region may form a front surface of the flexible display device. The first region may be formed as a plane surface. The first region may be parallel to the first direction and the second direction.

The second region may be a region of the flexible display that extends from the first region. A portion of the second region may be curved. A portion of the second region may be curved into a semicircular shape, and as the second body moves, the position of the curved portion in the second region may be changed.

A surface area of the second region that forms a single plane surface with the first region may change as the second body moves.

The second region may be curved around the support.

A portion of the second region may be curved about a curvature center line, which coincides with the rotational axis of the support, to form a curved surface.

The second region may include a first connected region and a second connected region.

The first connected region may be a region that extends from the first region.

The second connected region may be a region that extends from the first connected region.

When the second body is in the first position, the first connected region may be curved around the support to form a curved surface, and the second connected region may be parallel to the first region. When the second body is in the first position, the first connected region may be curved around the support to form a curved surface. When the second body is in the first position, the first connected region may form a curved surface of a semicircular shape about the curvature center line.

When the second body is in the second position, the first connected region may form a single plane surface with the first region, and a portion of the second connected region may be curved around the support, forming a curved surface. When the second body is in the second position, a portion of the second connected region may be curved around the support to form a curved surface. When the second body is in the second position, a portion of the second connected region may form a curved surface of a semicircular shape about the curvature center line.

In some embodiments, a flexible display device may include a ball module and a rail.

The ball module includes a case and a plurality of moving balls.

The case is fixed to the first body. A circulation path is formed in the case.

The circulation path as a passage formed in the case is configured in a circulation structure. That is, when the ball module starts at any one spot (start spot) and moves along the circulation path, the ball module meets the start spot again.

The rail is fixed to the second body. A sliding groove parallel to the first direction is formed in the rail.

Each of the plurality of moving balls is configured in a ball shape. The plurality of moving balls is inserted into the circulation path, and arranged to be movable along the circulation path.

Some of the plurality of moving balls contact the sliding groove.

In some embodiments, the rail and the ball module are provided at both sides of the flexible display device, respectively.

The circulation path includes an outer path, an inner path, an upper path, and a lower path.

The outer path is opened outward in the first direction and faces the sliding groove.

The inner path is parallel to the outer path and formed inside the case.

The upper path connects the outer path and the inner path, and is configured in a curve form.

The lower path connects the outer path and the inner path, and is configured in the curve form, at an opposite side to the upper path.

A length of each of the outer path and the inner path may be configured to be a predetermined length in a range of 3 to 10 times of a diameter of the moving ball.

A width between the center of the outer path and the center the inner path may be configured to have a predetermined size in a range of 1 to 2 times of the diameter of the moving ball.

The case includes a central case, an upper case, and a lower case.

The outer path and the inner path are formed in the central case.

The upper path is formed in the upper case. The upper case is detachably coupled to the central case.

The lower path is formed in the lower case. The lower case is detachably coupled to the central case.

In some embodiments, the flexible display device further includes a retainer.

In the retainer, a first through hole to which each moving ball is fitted is repeatedly formed. The retainer is inserted into the circulation path, and flexibly bent to rotate along the circulation path.

In some embodiments, grease is applied to the circulation path.

The sliding groove includes a first contact portion, a second contact portion, and a non-contact portion.

The first contact portion and the second contact portion are configured in a concave groove form, and contact the moving ball.

The non-contact portion is configured in the concave groove form between the first contact portion and the second contact portion, and spaced apart from the moving ball.

In some embodiments, a curvature of the sliding groove is equal to a curvature of the moving ball, and a length of an arc formed by the sliding groove is configured to as 50 to 55% of the diameter of the moving ball.

In some embodiments, the case is fixed to an end portion of the first body close to the support based on the first direction.

According to an aspect of the present disclosure, the first body includes a first side edge portion and a second side edge portion, and the second body includes a third side edge portion and a fourth side edge portion.

The first side edge portion and the second side edge portion are parallel to the first direction.

The third side edge portion faces the first side edge portion.

The fourth side edge portion faces the second side edge portion.

According to an aspect of the present disclosure, the flexible display device includes a first ball module and a second ball module.

Each of the first ball module and the second ball module may be configured like the above-described ball modules.

According to an aspect of the present disclosure, the flexible display device includes a first rail and a second rail.

Each of the first rail and the second rail may be configured like the above-described rail.

The first ball module includes a plurality of first moving balls.

Each of the plurality of first moving balls is configured in the ball shape, and arranged along a first circulation path which is a passage form circulated between the first side edge portion and the third side edge portion.

The second ball module includes a plurality of second moving balls.

Each of the plurality of second moving balls is configured in the ball shape, and arranged along a second circulation path which is a passage form circulated between the second side edge portion and the fourth side edge portion.

According to an aspect of the present disclosure, the first body and the second body are connected by mediating the first moving ball and the second moving ball.

The first ball module includes a first case.

In some embodiments, the third side edge portion is positioned at the outer side of the first side edge portion and the fourth side edge portion is positioned at the outer side of the second side edge portion.

In some embodiments, the first side edge portion and the second side edge portion are positioned between the third side edge portion and the fourth side edge portion.

The first circulation path is formed in the first case. The first case is fixed to an outer surface of the first side edge portion.

A first sliding groove is formed in the first rail. The first sliding groove is formed on the inner surface of the first rail, and configured in the concave groove form in the first direction and configured to contact the plurality of first moving balls. The first rail is fixed to the inner surface of the third side edge portion.

The second ball module includes a second case.

The second circulation path is formed in the second case. The second case is fixed to the outer surface of the second side edge portion.

A second sliding groove is formed in the second rail. The second sliding groove is formed on the inner surface of the second rail, and configured in the concave groove form in the first direction and configured to contact the plurality of second moving balls. The second rail is fixed to the inner surface of the fourth side edge portion.

The first circulation path includes a first outer path, a first inner path, a first upper path, and a first lower path.

The first outer path is formed in the first direction and opened toward the first sliding groove, and has a length being 3 to 10 times of a diameter of the first moving ball.

The first inner path is parallel to the first outer path and has the same length as the first outer path, and formed inside the first case.

The first upper path connects the first outer path and the first inner path, and configured in the curve form.

The first lower path connects the first outer path and the first inner path, and configured in the curve form, at an opposite side to the first upper path.

The width between the center of the first outer path and the center of the first inner path is configured to be 1 to 2 times of the diameter of the first moving ball.

The second circulation path includes a second outer path, a second inner path, a second upper path, and a second lower path.

The second outer path is formed in the first direction and opened toward the second sliding groove, and has a length being 3 to 10 times of a diameter of the second moving ball.

The second inner path is parallel to the second outer path and has the same length as the second outer path, and formed inside the second case.

The second upper path connects the second outer path and the second inner path, and configured in the curve form.

The second lower path connects the second outer path and the second inner path, and configured in the curve form, at an opposite side to the second upper path.

The width between the center of the second outer path and the center of the second inner path is configured to be 1 to 2 times of the diameter of the second moving ball.

The first case includes a first central case, a first upper case, and a first lower case.

The first outer path and the first inner path are in the first central case.

The first upper path is formed in the first upper case. The first upper case is detachably coupled to the first central case.

The first lower path is formed in the first upper case. The first lower case is detachably coupled to the first central case.

The second case includes a second central case, a second upper case, and a second lower case.

The second outer path and the second inner path are in the second central case.

The second upper path is formed in the second upper case. The second upper case is detachably coupled to the second central case.

The second lower path is formed in the second lower case. The second lower case is detachably coupled to the second central case.

The first ball module further includes a first retainer.

In the first retainer, a first through hole to which each first moving ball is fitted is repeatedly formed. The first retainer is inserted into the first circulation path, and flexibly bent to rotate along the first circulation path.

The second ball module further includes a second retainer.

In the second retainer, a second through hole to which each second moving ball is fitted is repeatedly formed. The second retainer is inserted into the second circulation path, and flexibly bent to rotate along the second circulation path.

In some embodiments, the flexible display device further includes a plurality of support bars.

The support bar is configured to be long in a direction parallel to a second direction which is a direction toward the fourth side edge portion from the third side edge portion, and fixed to the inner surface of the second region.

The support bar includes a first support slider, a second support slider, and a connection arm.

The first support slider forms one end portion of the support bar.

The second support slider forms an end portion of the support bar at an opposite side to the first support slider.

The connection arm connects the first support slider and the second support slider, and supports the second region.

In some embodiments, the second body includes a first movement guide groove and a second movement guide groove.

The first movement guide groove forms a path configured in a U-shaped groove, into which the first support slider is inserted and moved.

The second movement guide groove forms a path configured in the U-shaped groove, into which the second support slider is inserted and moved.

In some embodiments, the flexible display device further includes an inner plate.

The inner plate is configured by a metallic plate which is elastic and bent, and coupled to the inner surface of the second region.

The support bar may be fixed to the inner surface of the inner plate.

Advantageous Effect

In a flexible display device, when a flexible display is deformed while a first body and a second body move slidably to each other, a plurality of moving balls do not slid on a plurality of sliding grooves and a circulation path, and move along the circulation path while rolling-contacting the sliding groove. As a result, friction depending on slip can be prevented, and frictional force (motor frictional force) which is generated around the moving ball can be remarkably reduced, and a soft operation of the flexible display device is achieved.

In the flexible display device a first body includes a first side edge portion and a second side edge portion, and a second body includes a third side edge portion and a fourth side edge portion facing each other outside the first side edge portion and the second side edge portion. A first case forming a first ball module is fixed to an outer surface of the first side edge portion, and a first rail is fixed to an inner surface of the third side edge portion. A second case forming a second ball module is fixed to an outer surface of the second side edge portion, and a second rail is fixed to an inner surface of the fourth side edge portion. As a result, when the second body moves between a first position and a second position, the first ball module and the second ball module can be prevented from being exposed to the outside, and foreign substances can be prevented from invading the first ball module and the second ball module.

In the flexible display device, the first side edge portion and the second side edge portion are positioned between the third side edge portion and the fourth side edge portion, the first ball module and the first rail are coupled between the first side edge portion and the third side edge portion, and the second ball module and the second rail are coupled between the second side edge portion and the fourth side edge portion. Therefore, the first ball module, the first rail, the second ball module, and the second rail prevent movement of the second body in a direction (or an opposite direction to the first direction) other than the first direction relatively to the first body while guiding movement of the second body in the first direction (or the opposite direction to the first direction) relatively to the first body. Further, the second body relatively to the first body can accurately move in an intended direction without being tilted, and unintended transformation of the flexible display can be prevented.

BRIEF DESCRIPTION OF DRAWINGS

FIG. 4 is an exploded perspective view illustrating the flexible display device of FIG. 2a.

FIG. 17c is a perspective view illustrating a retainer according to a different embodiment from FIG. 16a.

DETAILED DESCRIPTION

Figure 1:
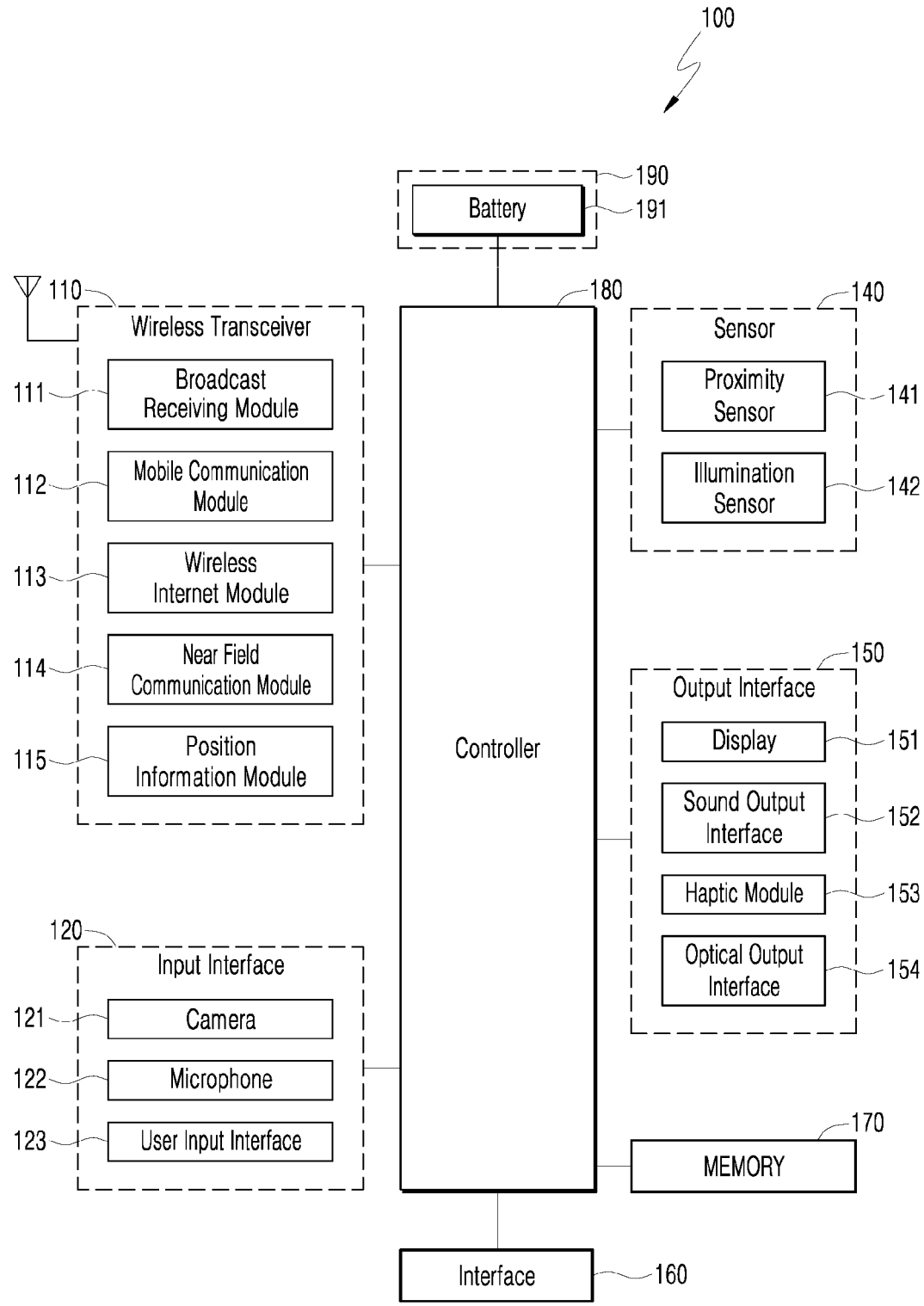
FIG. 1 is a block diagram for describing a flexible display device.

Hereinafter, exemplary embodiments disclosed herein will be described in detail with reference to the accompanying drawings, and like reference numerals designate like elements, and redundant description thereof will be omitted. Suffixes "module" and "unit or portion" for elements used in the following description are merely provided for facilitation of preparing this specification, and thus they are not granted a specific meaning or function. Wherever possible, the same reference numbers will be used throughout the drawings to refer to the same or like parts. In the following description, known functions or structures, which may confuse the substance of the present disclosure, are not explained. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, and the like, may be used herein to describe various elements, these elements should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

The singular expressions include plural expressions unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

A flexible display device (also referred to as a 'display device') described in the present specification may include a mobile terminal such as a portable phone, a smartphone, a laptop computer, a digital broadcast terminal, a personal digital assistant (PDA), a portable multimedia player (PMP), a navigation, a slate PC, a tablet PC, an ultra-book, a wearable device, a smart watch, a smart glass, a head mounted display (HMD), and the like.

It will be apparent to those skilled in the art that the configuration according to the embodiments disclosed in the present specification may be applied to fixed terminals such as a digital TV, a desktop computer, a digital signage, and the like, except for when the configuration is applied only to a mobile terminal. Hereinafter, in the present disclosure, for the convenience of description, the mobile terminal will be first described as an example of the flexible display device.

FIG. 1 is a block diagram for explaining a mobile terminal 100 related to the present disclosure.

The mobile terminal 100 may include a wireless transceiver 110, an input interface 120, a sensor 140, an output interface 150, an interface 160, a memory 170, a controller 180, and a power supply 190. The elements shown in FIG. 1 are not essential to implement the mobile terminal, and the mobile terminal described in this specification may include more or fewer elements than the above-enumerated elements.

More specifically, the wireless transceiver 110 may include one or more modules that enable wireless communications between the mobile terminal 100 and a wireless communication system, between the mobile terminal 100 and another mobile terminal 100, or between the mobile terminal 100 and an external server. Further, the wireless transceiver 110 may include one or more modules connecting the mobile terminal 100 to one or more networks.

The wireless transceiver 110 may include at least one of a broadcast receiving module 111, a mobile communication module 112, a wireless internet module 113, a near field communication module 114, or a position information module 115.

The input interface 120 may include a camera 121 or a video input interface, which are configured to receive input of a video signal, a microphone 122 or an audio input interface, which are configured to receive input of an audio signal, and a user input interface 123 (for example, a touch key or a mechanical key), which is configured to receive an input of information from a user. Voice data or image data collected by the input interface 120 may be analyzed and processed as a control command of the user.

The sensor 140 may include one or more sensors configured to sense at least one piece of information among information in the mobile terminal, surrounding environment information of the mobile terminal, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, a gas sensor, etc.), and a chemical sensor (for example, an electronic nose, a healthcare sensor, or a biometric sensor). Further, the mobile terminal disclosed in the present specification may combine information sensed by at least two sensors from the above-mentioned sensors and may use the combined information.

The output interface 150 may be for generating outputs related to visual, auditory, or tactile senses, and may include at least one of a display 151, a sound output interface 152, a haptic module 153, or an optical output interface 154. The display 151 may form a mutual layer structure with a touch sensor or may be formed integrally with a touch sensor, to be implemented as a touch screen. The touch screen may serve as a user input interface 123 configured to provide an input interface between the mobile terminal 100 and the user, and at the same time, may provide an output interface between the mobile terminal 100 and the user.

The interface 160 may serve as a passage between the mobile terminal 100 and various types of external devices connected to the mobile terminal 100. The interface 160 may include at least one of a wired/wireless headset port, an external charger port, a wired/wireless data port, a memory card port, a port for connecting a device equipped with an identification module, an audio input/output (I/O) port, a video input/output (I/O) port, or an earphone port. In response to a connection between an external device and the interface 160, the mobile terminal 100 may perform an appropriate control regarding the connected external device.

Further, the memory 170 may store therein data supporting various functions of the mobile terminal 100. The memory 170 may store therein a plurality of application programs (or applications) driven in the mobile terminal 100, data for operations of the mobile terminal 100, and commands. At least some of the application programs may be downloaded from an external server through wireless communication. Further, for the basic functions of the mobile terminal 100 (for example, functions for receiving and making calls and receiving and sending messages), at least some of the application programs may be provided in the mobile terminal 100 from the time of manufacture. The application programs may be stored in the memory 170 and installed on the mobile terminal 100 so as to be driven by the controller 180 to perform operations (or functions) of the mobile terminal 100.

In addition to the operations related to the application programs, the controller 180 may generally control overall operation of the mobile terminal 100. The controller 180 may process a signal, data, or information that is inputted or outputted through the above-described elements or drive the application programs stored in the memory 170 to thereby provide appropriate information or functions to the user or process them.

Further, in order to drive the application programs stored in the memory 170, the controller 180 may control at least one of the elements described with reference to FIG. 1. Moreover, the controller 180 may combine and operate at least two of the elements included in the mobile terminal 100 to drive the application programs.

Under the control of the controller 180, the power supply 190 may be supplied with external power or internal power, and supply power to each element included in the mobile terminal 100. The power supply 190 may include a battery, and the battery may be an internal battery or a replaceable battery.

At least some of the above-described elements may operate in cooperation with each other to implement the operation or control of the mobile terminal or the control method of the mobile terminal according to various embodiments which will be described below. Further, the operation or control of the mobile terminal or the control method of the mobile terminal may be implemented on the mobile terminal by driving at least one application program stored in the memory 170.

Hereinafter, prior to describing various embodiments implemented by the mobile terminal 100 described above, the above-mentioned elements will be described in more detail with reference to FIG. 1.

The broadcast receiving module 111 of the wireless transceiver 110 may receive a broadcast signal and/or broadcast-related information from an external broadcast management server through a broadcast channel. The broadcast channel may include a satellite channel and a ground wave channel. The mobile terminal 100 may be provided with two or more broadcast receiving modules for simultaneous reception of at least two broadcast channels or for broadcast channel switching.

The broadcast management server may refer to a server that generates and transmits a broadcast signal and/or broadcast-related information, or a server that is supplied with a previously generated broadcast signal and/or broadcast-related information and transmits the supplied broadcast signal and/or broadcast-related information to the mobile terminal 100. The broadcast signal may include not only a TV broadcast signal, a radio broadcast signal, and a data broadcast signal, but also a broadcast signal obtained by combining a TV broadcast signal or a radio broadcast signal with a data broadcast signal.

The broadcast signal may be encoded according to at least one of technical standards for transmission and reception of a digital broadcast signal (or broadcast schemes, such as ISO, IEC, DVB, or ATSC), and the broadcast receiving module 111 may receive the digital broadcast signal by using an appropriate method meeting the technical specification determined by the technical standards.

The broadcast-related information may refer to information related to a broadcast channel, a broadcast program, or a broadcast service provider. The broadcast-related information may also be provided through the mobile communication network. Here, the broadcasting-related information may be received by the mobile communication module 112.

The broadcast-related information may exist in various forms, such as an electronic program guide of digital multimedia broadcasting (DMB) or an electronic service guide of a digital video broadcast-handheld (DVB-H). The broadcast signal and/or the broadcast-related information received through the broadcast receiving module 111 may be stored in the memory 170.

The mobile communication module 112 may transmit/receive a wireless signal to/from at least one of a base station, an external terminal, or a server on a mobile communication network established according to the technical standards for mobile communications or communication methods (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various forms of data for transmission or reception of a text/multimedia message.

The wireless internet module 113 may refer to a module for wireless Internet connection, and may be installed in the mobile terminal 100 or installed outside the mobile terminal 100. The wireless internet module 113 may be configured to transmit and receive a wireless signal over a communication network according to wireless Internet technologies.

Wireless Internet technologies may include, for example, wireless LAN (WLAN), wireless fidelity (Wi-Fi), Wi-Fi direct, Digital Living Network Alliance (DLNA), wireless broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless internet module 113 may transmit and receive data in accordance with at least one wireless Internet technology from among the above-mentioned wireless Internet technologies and wireless Internet technologies that were not described above.

From the viewpoint that the wireless internet connection through, for example, WiBro, HSDPA, HSUPA, GSM, CDMA, WCDMA, LTE, and LTE-A is made through the mobile communication network, the wireless internet module 113, which performs the wireless Internet connection through the mobile communication network, may be understood as one type of the mobile communication module 112.

The near field communication module 114 may be for short-range communications, and may support short-range communications by using at least one of Bluetooth™, radio frequency identification (RFID), infrared data association (IrDA), ultra wideband (UWB), ZigBee, Short-range Communication (NFC), wireless fidelity (Wi-Fi), Wi-Fi Direct, or Wireless Universal Serial Bus (Wireless USB). The near field communication module 114 may support wireless communications, over a near-field wireless communication network, between the mobile terminal 100 and the wireless communication system, between the mobile terminal 100 and another mobile terminal 100, or between the mobile terminal 100 and a network in which another mobile terminal 100 (or external server) is located. The near-field wireless communication network may be a wireless personal area network.

Here, the another mobile terminal 100 may be a wearable device (for example, a smart watch, a smart glass, or a head mounted display (HMD)) capable of exchanging data (or interworking) with the mobile terminal 100 according to the present disclosure. The near field communication module 114 may sense (or recognize) the presence of a wearable device that is capable of communicating with the mobile terminal 100, in the vicinity of the mobile terminal 100. Moreover, when the detected wearable device is a device that has been authenticated to communicate with the mobile terminal 100 according to the present disclosure, the controller 180 may transmit at least a portion of data processed in the mobile terminal 100 to the wearable device through the near field communication module 114. Therefore, the user of the wearable device may use, through the wearable device, the data that have been processed in the mobile terminal 100. For example, according to this, when a phone call is received by the mobile terminal 100, the user may receive the phone call through the wearable device, or when a message is received by the mobile terminal 100, the user may check the received message through the wearable device.

The position information module 115 may be a module for obtaining a position (or a current position) of a mobile terminal, and its representative examples may include a global positioning system (GPS) module or a wireless fidelity (Wi-Fi) module. For example, when a GPS module is utilized, the mobile terminal may obtain the position of the mobile terminal by using a signal transmitted from a GPS satellite. As another example, when a Wi-Fi module is utilized, the mobile terminal may obtain the position of the mobile terminal on the basis of information on a wireless access point (AP) which transmits and receives wireless signals to and from the Wi-Fi module. If necessary, the position information module 115 may alternatively or additionally perform a function of another module of the wireless transceiver 110 to obtain data on the position of the mobile terminal. The position information module 115 may be a module used to obtain the position (or the current position) of the mobile terminal, and is not limited to a module that directly calculates or obtains the position of the mobile terminal.

Next, the input interface 120 may be for receiving input of video information (or signal), audio information (or signal), data, or information inputted by the user. For receiving input of the video information, the mobile terminal 100 may include a camera 121 or a plurality of cameras 121. The camera 121 may process an image frame such as a still image or a moving image obtained by an image sensor in a video call mode or a photographing mode. The processed image frame may be displayed on the display 151 or stored in the memory 170. Further, the plurality of cameras 121 provided in the mobile terminal 100 may be arranged to form a matrix structure, and a plurality of pieces of image information having various angles or focal points may be inputted to the mobile terminal 100 through the plurality of cameras 121 forming the matrix structure. In addition, the plurality of cameras 121 may be arranged to form a stereo structure to obtain left and right images used to implement a stereoscopic image.

The microphone 122 may process an external sound signal into electric voice data. The processed voice data may be utilized in various manners in accordance with the function that is being performed in the mobile terminal 100 (or in accordance with an application program that is being executed). Various noise removal algorithms for removing noise generated during the process of receiving the external sound signal may be implemented in the microphone 122.

The user input interface 123 may be for receiving information from the user, and when information is inputted through the user input interface 123, the controller 180 may control operation of the mobile terminal 100 so as to correspond to the inputted information. The user input interface 123 may include a mechanical input interface (or a mechanical key, such as a button located on a front, rear, or side surface of the mobile terminal 100, a dome switch, a jog wheel, a jog switch, etc.) and a touch type input interface. For example, the touch type input interface may be formed as a virtual key, a soft key, or a visual key displayed on a touch screen through a software process, or as a touch key disposed in a part other than the touch screen. The virtual key or the visual key may be displayed on the touch screen in various shapes, and may include, for example, graphics, text, icons, video, or a combination thereof.

The sensor 140 may sense at least one of information in the mobile terminal, information of the surrounding environment of the mobile terminal, or user information, and generate a sensing signal corresponding to sensed information. On the basis of the sensing signal, the controller 180 may control the driving or operation of the mobile terminal 100 or perform data processing, functions, or operations related to an application program installed in the mobile terminal 100. Representative sensors among various sensors that can be included in the sensor 140 will now be described in more detail.

First, the proximity sensor 141 may be a sensor that senses the presence of an object that is approaching a predetermined sensing surface or the presence of nearby objects, by using the force of an electromagnetic field or infrared ray without any mechanical contact. The proximity sensor 141 may be disposed in an internal area of the mobile terminal 100, which is enclosed by the above-described touch screen, or may be disposed in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect proximity of an object by sensing a change in the electric field caused by an approaching object having conductivity. Here, the touch screen (or the touch sensor) itself may be classified as a proximity sensor.

For convenience of description, when an object approaches the touch screen without contacting the touch screen, and it is recognized that the object is located above the touch screen, it is referred to as a "proximity touch." When the object actually touches the touch screen, it is referred to as a "contact touch." A position at which the object proximately touches the touch screen may be a position at which the object vertically corresponds to the touch screen when the object proximately touches the touch screen. The proximity sensor 141 may sense a proximity touch and a proximity touch pattern (for example, a proximity touch distance, a proximity touch direction, a proximity touch speed, a proximity touch time, a proximity touch position, a proximity touch movement state, etc.). As described above, the controller 180 may process data (or information) corresponding to a proximate touch operation and a proximate touch pattern sensed by the proximity sensor 141, and may output visual information corresponding to the processed data on the touch screen. Furthermore, the controller 180 may control the mobile terminal 100 to process different operations or data (or information) depending on whether the touch on the same point on the touch screen is the proximity touch or the contact touch.

The touch sensor may sense a touch (or a touch input) applied to the touch screen (or the display 151) by using at least one of various touch types, such as a resistive film type, a capacitive type, an infrared type, an ultrasonic type, and a magnetic field type.

For example, the touch sensor may be configured to convert a change in pressure that is applied to a specific portion of the touch screen, or a change in capacitance that is generated in a specific portion of the touch screen, into an electrical input signal. The touch sensor may be configured to detect a position where a touch subject which applies a touch onto the touch screen is touched on the touch sensor, the surface area of the touch, the pressure of the touch, and the capacitance at the time of the touch. Here, the touch subject may be an object that applies a touch to the touch sensor, and may include, for example, a finger, a touch pen, a stylus pen, and a pointer.

As described above, when there is a touch input to the touch sensor, a signal or signals corresponding to the touch input may be transmitted to a touch controller. The touch controller may process the signal(s) and then transmit corresponding data to the controller 180. Then, the controller 180 may confirm which area of the display 151 was touched. Here, the touch controller may be a separate element from the controller 180, or may be the controller 180 itself.

The controller 180 may perform a different control or the same control depending on a type of a touch subject touching the touch screen (or a touch key provided other than the touch screen). Whether to perform a different control or the same control depending on the type of touch subject may be determined in accordance with a current operating state of the mobile terminal 100 or an application program that is being executed.

The touch sensor and the proximity sensor described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information of a sensing object by using an ultrasonic wave. The controller 180 may be able to calculate a position of a wave generating source from information sensed by an optical sensor and a plurality of ultrasonic sensors. The position of the wave generating source may be calculated by using the property of light that light is much faster than an ultrasonic wave, that is, the time in which light reaches the optical sensor is much shorter than the time in which the ultrasonic wave reaches the ultrasonic sensor. More specifically, the position of the wave generating source may be calculated by using the difference between the arrival time of the ultrasonic wave and the arrival time of the light, with the light as a reference signal.

As an element of the input interface 120, the camera 121 may include at least one of a camera sensor (for example, a CCD or a CMOS), a photo sensor (or an image sensor), or a laser sensor.

The camera 121 and the laser sensor may be combined to sense a touch of a sensing object for a three-dimensional stereoscopic image. The photo sensor may be stacked on a display element and may be configured to scan a motion of the sensing object proximate to the touch screen. More specifically, the photo sensor may be formed by mounting a photo diode and a transistor (TR) in rows/columns to scan an object on the photo sensor by using an electrical signal which changes in accordance with the amount of light applied to the photo diode. That is, the photo sensor may calculate coordinates of a sensing object in accordance with a change in the amount of light, to thereby obtain position information of the sensing object.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

Further, the display 151 may be configured as a stereoscopic display which displays a stereoscopic video.

A three-dimensional display type, such as a stereoscopic type (a glasses type), an autostereoscopic type (a glasses-free type), and a projection type (a holographic type), may be applied to the stereoscopic display.

The sound output interface 152 may output audio data received from the wireless transceiver 110 in, for example, a call signal reception mode, a phone-call mode, a recording mode, a voice recognition mode, and a broadcast reception mode, or audio data stored in the memory 170. The sound output interface 152 may also output a sound signal (for example, a call signal reception sound and a message reception sound) related to a function performed in the mobile terminal 100. The sound output interface 152 may include, for example, a receiver, a speaker, and a buzzer.

The haptic module 153 may generate various tactile effects the user can feel. A representative example of the tactile effect generated by the haptic module 153 may be vibration. An intensity and a pattern of the vibration generated in the haptic module 153 may be controlled by the user or a setting of the controller 180. For example, the haptic module 153 may synthesize vibrations different from one another to output the synthesized vibrations, or sequentially output the different vibrations.

In addition to vibration, the haptic module 153 may generate various tactile effects, such as effects by a pin arrangement which vertically moves to a contact skin surface, an injection force or a suction force of air through an injection port or a suction port, grazing on a skin surface, electrode contact, or stimulation of an electrostatic force or effects of reproducing a cold or hot sensation using a heat absorbing or heat emitting element.

The haptic module 153 may not only transmit a tactile effect through direct contact, but may also be implemented to allow the user to feel a tactile effect through muscular sensation of a finger or an arm. Two or more haptic modules 153 may be provided depending on the configuration of the mobile terminal 100.

The optical output interface 154 may output a signal for providing notification of occurrence of an event by using light of a light source of the mobile terminal 100. Examples of the events generated in the mobile terminal 100 may include, for example, message reception, call signal reception, missed call, alarm, schedule notification, email reception, and information reception through an application.

The signal outputted from the optical output interface 154 may be implemented as the mobile terminal 100 emits light of a single color or a plurality of colors to a front surface or a rear surface thereof. The output of the signal may end as the mobile terminal 100 senses confirmation of the event by the user.

The interface 160 may serve as a passage to all external devices that are connected to the mobile terminal 100. The interface 160 may receive data from an external device or may be supplied with the power source and transmit the supplied power source to each element in the mobile terminal 100, or may transmit data in the mobile terminal 100 to an external device. The interface 160 may include, for example, a wired/wireless headset port, an external charger port, a wired/wireless data port, a memory card port, a port for connecting a device equipped with an identification module, an audio input/output (I/O) port, a video input/output (I/O) port, and an earphone port.

The identification module may be a chip in which various information for authenticating a user right of the mobile terminal 100 is stored, and may include a user identification module (UIM), a subscriber identification module (SIM), and a universal subscriber identity module (USIM). A device provided with an identification module (hereinafter, "identification device") may be manufactured in the form of a smart card. Therefore, the identification device may be connected to the mobile terminal 100 through the interface 160.

When the mobile terminal 100 is connected to an external cradle, the interface 160 may serve as a passage through which power is supplied from the cradle to the mobile terminal 100 or a passage through which various command signals inputted to the cradle by a user are transmitted to the mobile terminal 100. Various command signals inputted from the cradle or the power source may serve as a signal for recognizing that the mobile terminal 100 has been precisely mounted in the cradle.

The memory 170 may store a program for operation of the controller 180, or temporarily store inputted/outputted data (for example, a phone book, a message, a still image, and a moving image). The memory 170 may store data on various patterns of vibration or sound outputted when a touch is inputted onto the touch screen.

The memory 170 may include at least one type of storage medium from among a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The mobile terminal 100 may operate in association with a web storage which performs a storage function of the memory 170 on the Internet.

As described above, the controller 180 may control an operation related to application programs and overall operation of the mobile terminal 100. For example, when the state of the mobile terminal 100 satisfies a predetermined condition, the controller 180 may perform a locking function which limits input of a control command of a user for applications or may release the locking function.

Further, the controller 180 may perform control and processing related to voice call, data communication, and video call, or perform a pattern recognition process by which a handwriting input or a picture drawing input performed on the touch screen may be recognized as a text or an image, respectively. Moreover, the controller 180 may control any one element or a combination of a plurality of the elements described above, to implement various embodiments of the mobile terminal 100 according to the present disclosure which will now be described below.

Under the control of the controller 180, the power supply 190 may be supplied with an external power or an internal power and may supply power required for operating each element. The power supply 190 may include a battery, wherein the battery may be an embedded rechargeable battery or may be detachably coupled to a body of the mobile terminal 100 to be charged.

Further, the power supply 190 may be provided with a connection port, and the connection port may be configured as one example of the interface 160 to which an external charger that supplies power for charging the battery is electrically connected.

As another example, the power supply 190 may be configured to wirelessly charge the battery without using the connection port. Here, the power supply 190 may receive power from an external wireless power transmission device by using one or more of an inductive coupling scheme based on a magnetic induction phenomenon or a magnetic resonance coupling scheme based on an electromagnetic resonance phenomenon.

Various embodiments that will now be described below may be implemented in a recording medium which can be read by a computer or a device similar thereto by using software, hardware, or a combination thereof, for example.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

The display 151 may include at least one of a liquid crystal display (LCD), a thin film transistor liquid crystal display (TFT LCD), an organic light emitting diode (OLED), a flexible display, a three-dimensional display (3D display), or an electronic ink display (e-ink display).

Further, the display 151 may be two or more displays 151 depending on the implementation of the mobile terminal 100. Here, a plurality of displays 151 may be disposed to be spaced apart from each other or disposed integrally on one surface of the mobile terminal 100, or each of the plurality of displays 151 may be disposed on different surfaces of the mobile terminal 100.

The display 151 may include a touch sensor which senses a touch on the display 151 so as to receive input of a control command in the touch method. When a touch is made on the display 151, the touch sensor may sense the touch, and on the basis of the sensed touch, the controller 180 may generate a control command corresponding to the sensed touch, Contents inputted through the touch method may include letters, numbers, instructions in various modes, and menu items.

The microphone 122 may be configured to receive voice of the user and other sounds. The microphone 122 may be provided in a plurality of positions so as to receive stereo sounds.

The interface 160 may serve as a passage connecting the mobile terminal 100 to external devices. For example, the interface 160 may be at least one of a connection terminal for connection with other devices (for example, an earphone or an external speaker), a port for short-range communications (for example, an infrared port (IrDA port), a Bluetooth port, a wireless LAN port, etc.), or a power supply terminal for supplying power to the mobile terminal 100. The interface 160 may be implemented in the form of a socket accommodating an external card, such as a subscriber identification module (SIM), a user identity module (UIM), and a memory card for storing information.

At least one antenna for wireless communications may be provided in the body of the mobile terminal 100. The antenna may be embedded in the body of the mobile terminal 100 or may be formed in a case. For example, an antenna that forms a part of the broadcast receiving module 111 (see FIG. 1) may be implemented so as to be drawable from the body of the mobile terminal 100. Alternatively, the antenna may be formed as a film type to be attached to an inner surface of a housing, or a case including a conductive material may serve as an antenna.

The power supply 190 (see FIG. 1) for supplying power to the mobile terminal 100 may be provided in the body of the mobile terminal 100. The power supply 190 may be embedded in the body of the mobile terminal 100, or may include a battery 191 outside the body of the mobile terminal 100, the battery 191 being detachable.

The battery 191 may be configured to be supplied with power through a power cable connected to the interface 160. Further, the battery 191 may be configured to be wirelessly charged by a wireless charging device. The wireless charging may be implemented by a magnetic induction scheme or a resonance scheme (magnetic resonance scheme).

An accessory that protects an exterior of the mobile terminal 100 or supports or extends a function thereof may be added to the mobile terminal 100. An example of the accessory may be a cover that covers at least one surface of the mobile terminal 100 or a pouch accommodating the mobile terminal 100. The cover or the pouch, in conjunction with the display 151, may extend the function of the mobile terminal 100. Another example of the accessory may be a touch pen which supports or extends a touch input on the touch screen.

The flexible display device 1 according to the embodiment of the present disclosure may include a flexible display 300 which is configured to be deformed by an external force.

The deformation may be at least one of warping, bending, folding, twisting, rolling, or spreading of a display module. Such a deformable display module may be referred to as a "flexible display." Here, the flexible display 300 may include a general flexible display, an electronic paper (e-paper), and a combination thereof.

A general flexible display refers to a durable display which, while still having characteristics of existing flat panel displays, is produced on a thin and flexible substrate which can be warped, bent, folded, twisted, rolled, and spread like paper, so as to be light in weight and not to be easily broken.

Further, electronic paper is a display technique to which characteristics of general ink are applied. Electronic paper may be different from existing flat panel displays in that electronic paper uses reflection light. Electronic paper may change information thereon by using a twist ball or electrophoresis using a capsule.

Information displayed on the flexible display 300 may include visual information outputted on a curved surface. The visual information may be implemented as the light emission of unit pixels (sub pixels) that are arranged in a matrix form is independently controlled. The unit pixel refers to a minimum unit for implementing one color.

A portion of the flexible display 300 may be in a bent state, not in a flat state. Here, when an external force is applied to the flexible display 300, a portion of the flexible display 300 may be deformed into a flat state, a less bent state, or a more bent state.

Meanwhile, the flexible display 300 may be combined with a touch sensor to implement a flexible touch screen. When a touch input is made on the flexible touch screen, the controller 180 (see FIG. 1) may perform control corresponding to the touch input. The flexible touch screen may be configured to sense a touch input while a portion of the flexible display 300 is in the flat state or in the bent state.

A flexible display device 1 according to the example in which the flexible display 300 is deformable may include a deformation sensor capable of sensing deformation in the flexible display 300. The deformation sensor may be included in the sensor 140 (see FIG. 1).

The deformation sensor may be provided in the flexible display 300 or in a body 200, and may sense information related to deformation of the flexible display 300. Here, the information related to the deformation may include information on a direction in which the flexible display 300 is deformed, information on a degree of the deformation of the flexible display 300, information on a position of the deformation in the flexible display 300, information on a time of the deformation, and information on an acceleration at which the deformed flexible display 300 is recovered. In addition to the above information, various other types of information that can be sensed as the flexible display 300 is bent may also be included.

Further, the controller 180 (see FIG. 1) may change information displayed on the flexible display 300 or generate a control signal for controlling a function of the flexible display device 1, on the basis of the information related to the deformation of the flexible display 300 sensed by the deformation sensor.

The deformation of the flexible display 300 may not be limited to the deformation caused by an external force. For example, when the flexible display 300 is in a state in which a portion thereof is spread, the portion may be deformed to be bent by a command of the user or an application.

Figure 2A:
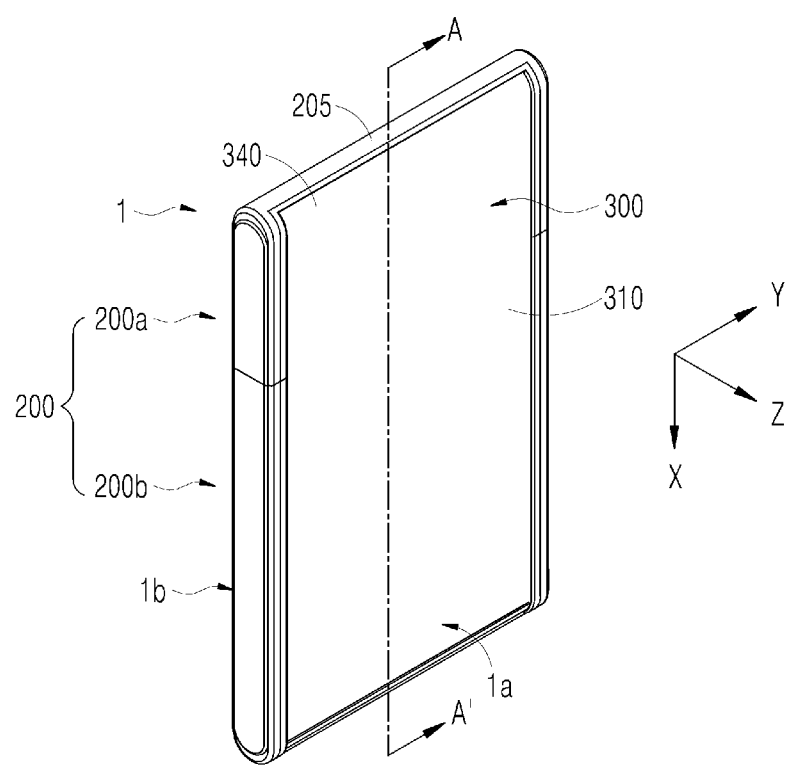
FIG. 2a is a perspective view illustrating a first state of the flexible display device and FIG. 2b is a perspective view illustrating a view of a second state in which the flexible display device illustrated in FIG. 2a is deformed.
Figure 2B:
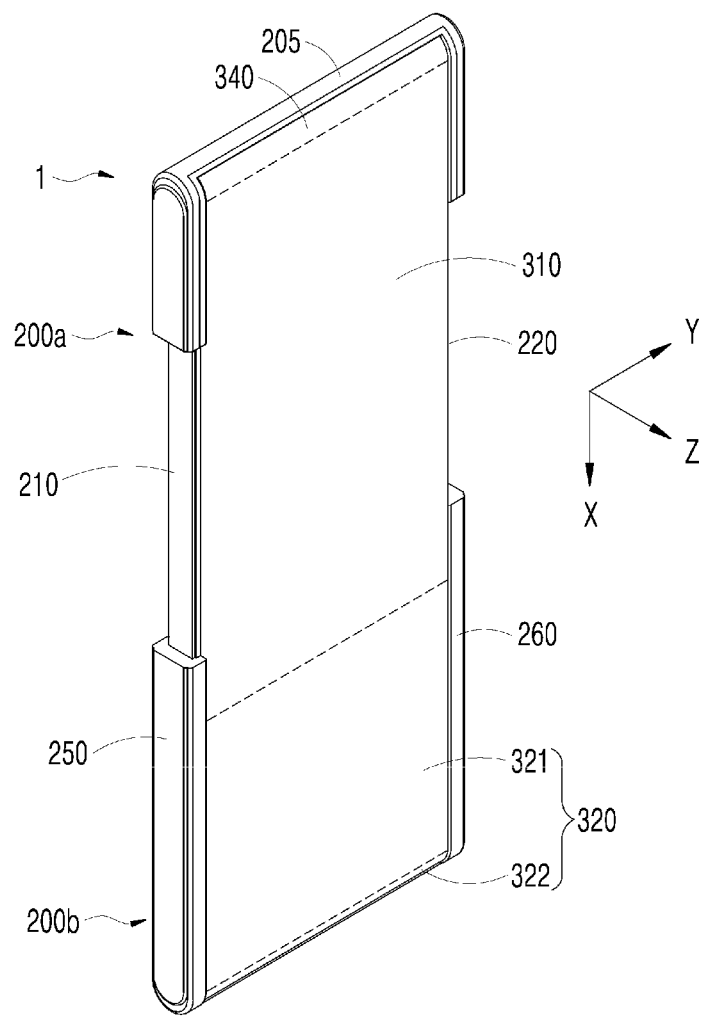

FIG. 2a is a perspective view of the flexible display device 1 in a first state, and FIG. 2b is a perspective view of the flexible display device 1 of FIG. 2a in a second state in which the flexible display has been deformed.

Figure 3A:
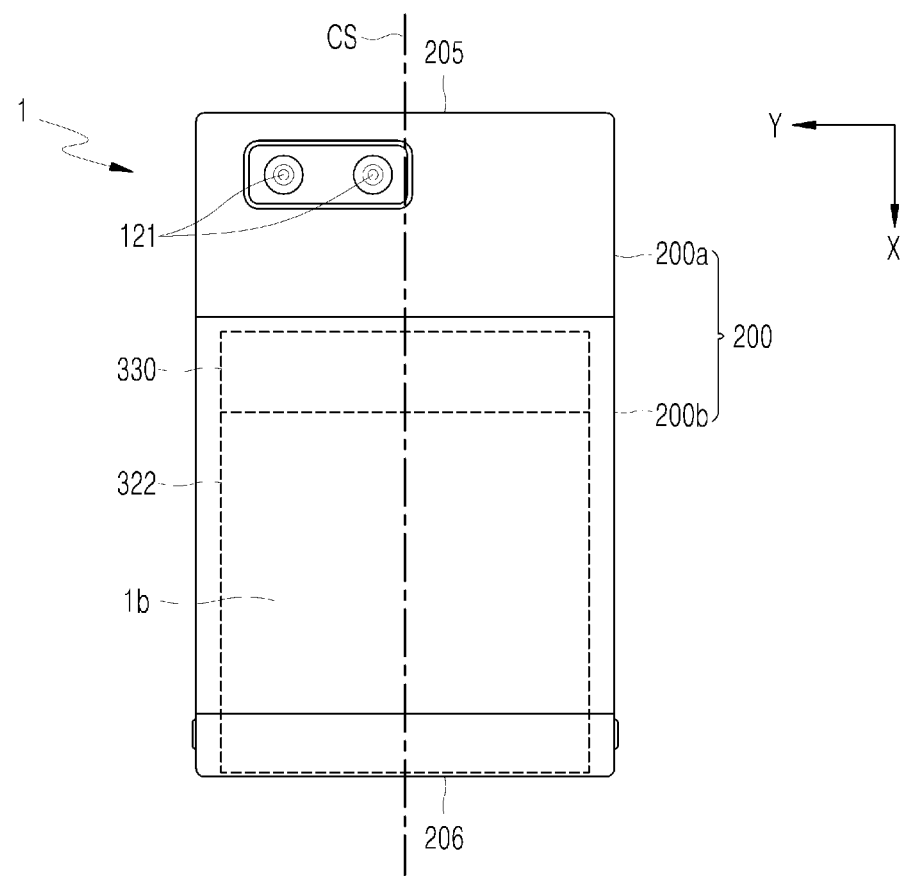
FIG. 3a is a bottom view illustrating the flexible display device of FIG. 2a and FIG. 3b is a bottom view illustrating the flexible display device illustrated in FIG. 2b.
Figure 3B:
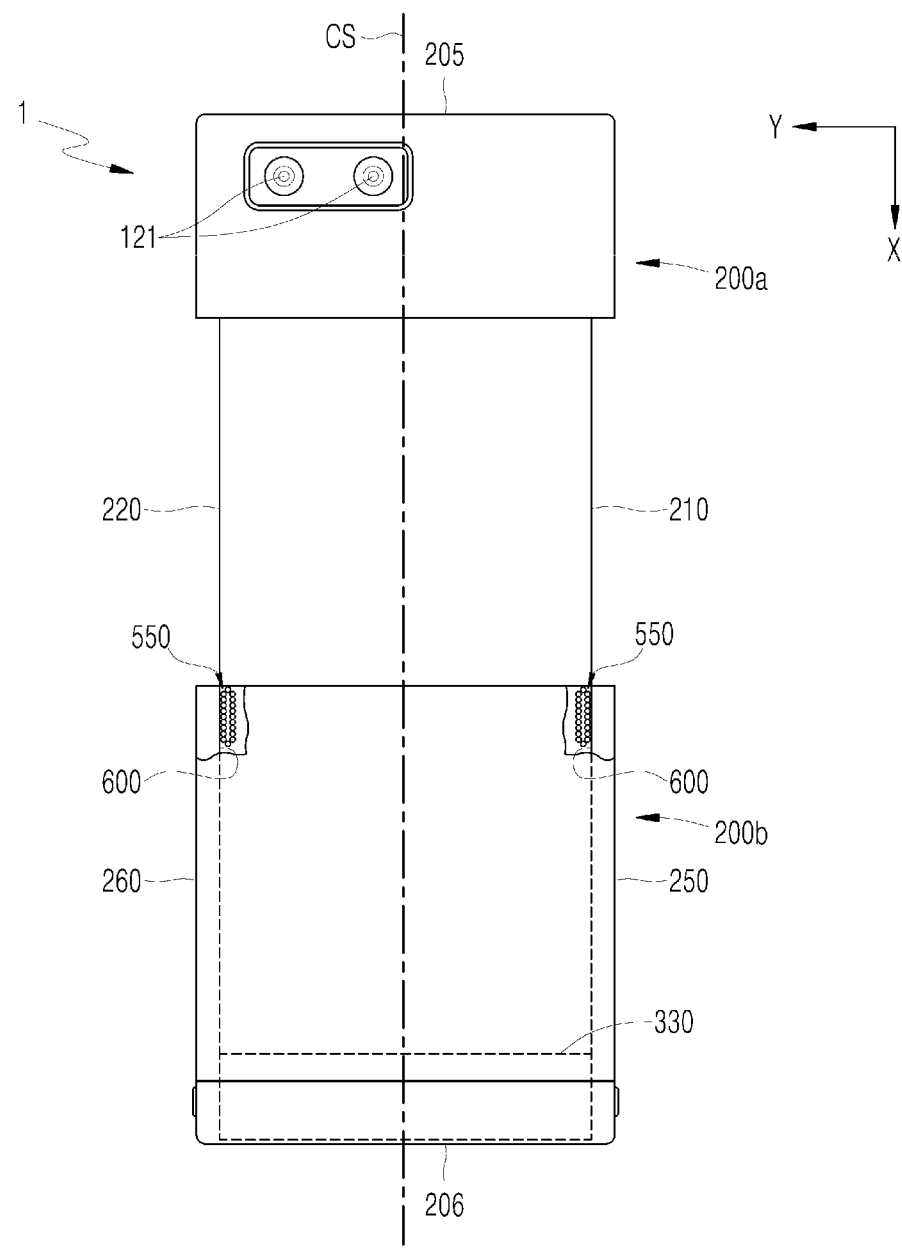
In FIG. 3b, a form in which a partial component is deleted is illustrated so that a location and an array of a moving ball provided inside the flexible display device are schematically illustrated.

FIG. 3a is a rear view of the flexible display device 1 of FIG. 2a, and FIG. 3b is a rear view of the flexible display device 1 of FIG. 2b.

Figure 4:
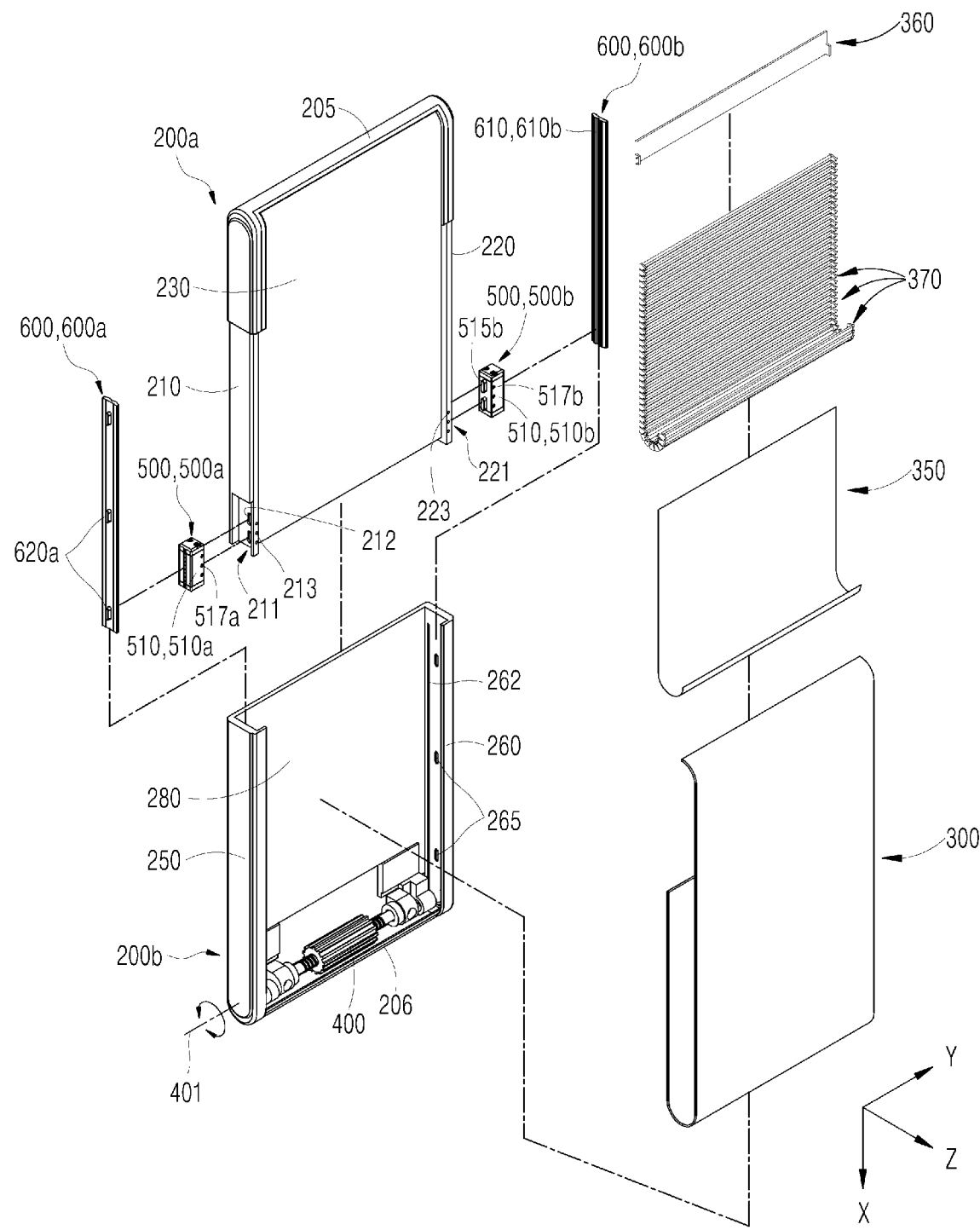

FIG. 4 is an exploded perspective view of the flexible display device 1 of FIG. 2a.

The flexible display device 1 may include a body 200, a plurality of support bars 370, and a support 400. The body 200 may include a first body 200a and a second body 200b.

In describing embodiments of the present disclosure, a first direction (X direction), a second direction (Y direction), and a third direction (Z direction) shown in the drawings are directions perpendicular to one another.

The flexible display device 1 may include two surfaces 1a and 1b which are opposite to each other. In other words, the flexible display device 1 may include a first surface 1a and a second surface 1b. A direction the first surface 1a faces (i.e. a direction perpendicular to or substantially perpendicular to the first surface 1a) may be opposite to a direction the second surface 1b faces (i.e. a direction perpendicular to or substantially perpendicular to the second surface 1b). In the flexible display device 1, the first surface 1a may face the third direction (Z direction), and the second surface 1b may face a direction opposite to the third direction (Z direction). When the first surface 1a is a front surface of the flexible display device 1, the second surface 1b may be a rear surface of the flexible display device 1.

Hereinafter, unless otherwise specified, the third direction (Z direction) refers to the forward direction of the flexible display device 1, and the direction opposite to the third direction (Z direction) refers to the rearward direction of the flexible display device 1.

The body 200 may form the overall shape of the flexible display device 1. The body 200 may form the frame of the flexible display device 1. The body 200 may be made of a relatively hard material. For example, the body 200 may be made of plastic, carbon, metal, or a combination thereof. Other components of the flexible display device 1 may be coupled to the body 200.

The body 200 may be formed in various shapes so as to support other components coupled thereto.

The body 200 may have a flat shape as a whole, or may have a curved shape such as a curved surface. An interior of the body 200 may be fully filled or may not be fully filled.

For example, when viewed from the front (third direction), the body 200 may have a quadrangular shape as a whole, and may be flat as a whole.

The body 200 may be divided into two or more parts. As described in detail above, the body 200 may include the first body 200a and the second body 200b, and the first body 200a and the second body 200b may be formed to move relative to each other (see FIGS. 2a, 2b, 3a, and 3b).

The second body 200b may slide and reciprocate relative to the first body 200a. Accordingly, when viewed from the front, the total area occupied by the body 200 may change as the second body 200b moves.

The second body 200b may reciprocate relative to the first body 200a between a first position and a second position.

When viewed from the front or rear, the total area occupied by the body 200 (the area of the body 200 projected in the Z direction) may be the smallest when the second body 200b is in the first position (see FIGS. 2a and 3a), and the total area occupied by the body 200 (the area of the body 200 projected in the Z direction) may be the largest when the second body 200b is in the second position (see FIGS. 2b and 3b).

When viewed from the front or rear, the overlapping area between the first body 200a and the second body 200b may be the largest when the second body 200b is in the first position (see FIGS. 2a and 3a), and the overlapping area between the first body 200a and the second body 200b may be the smallest when the second body 200b is in the second position (see FIGS. 2b and 3b).

A movement direction of the second body 200b relative to the first body 200a may be parallel to the first direction (X direction).

The first body 200a may have a predetermined length in the first direction (X direction), and may also have a predetermined length in the second direction (Y direction) orthogonal to the first direction. The first body 200a may have a predetermined length in the third direction (Z direction) orthogonal to the first and second directions, but the length of first body 200a in the third direction may be sufficiently small compared to the lengths thereof in the first and second directions. Accordingly, the first body 200a may be formed to be flat or substantially flat along the first and second directions.

The first body 200a may have a plate shape.

The second body 200b may have a predetermined length in the first and second directions. The second body 200b may have a predetermined length in the third direction, but the length of the second body 200b in the third direction may be sufficiently small compared to the lengths thereof in the first and second directions. Accordingly, the second body 200b may be formed to be flat or substantially flat in the first and second directions.

The second body 200b may have a plate shape.

The first body 200a and the second body 200b may be formed in the shape of plates parallel to each other.

Figure 5A:
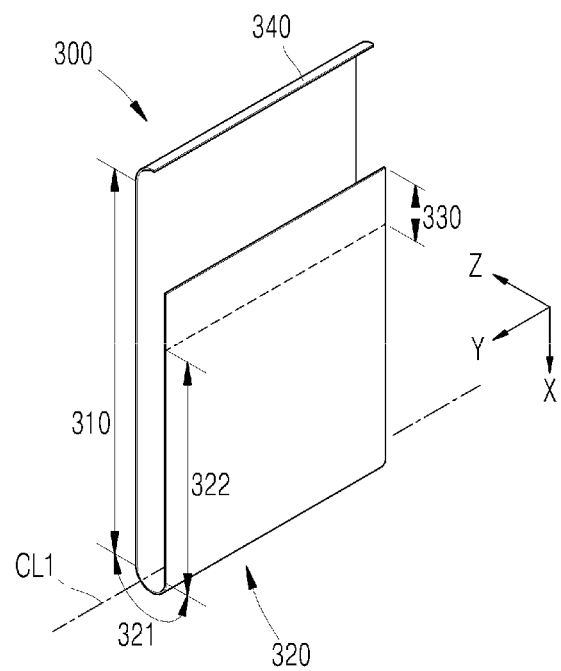
FIG. 5a is a perspective view illustrating a flexible display separated from the flexible display device of the first state and FIG. 5b is a perspective view illustrating a view (a view in the second state) in which the flexible display of FIG. 5a is deformed.
Figure 5B:
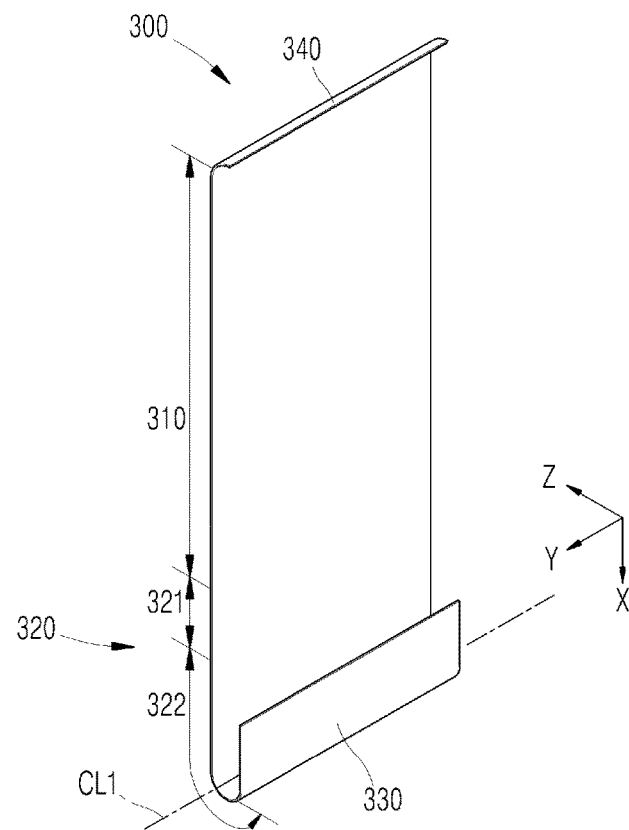

FIG. 5a is a perspective view of a flexible display separated from the flexible display device in the first state, and FIG. 5b is a perspective view of the flexible display of FIG. 5a when the flexible display has been deformed (i.e. when the flexible display device is in the second state).

Figure 6A:
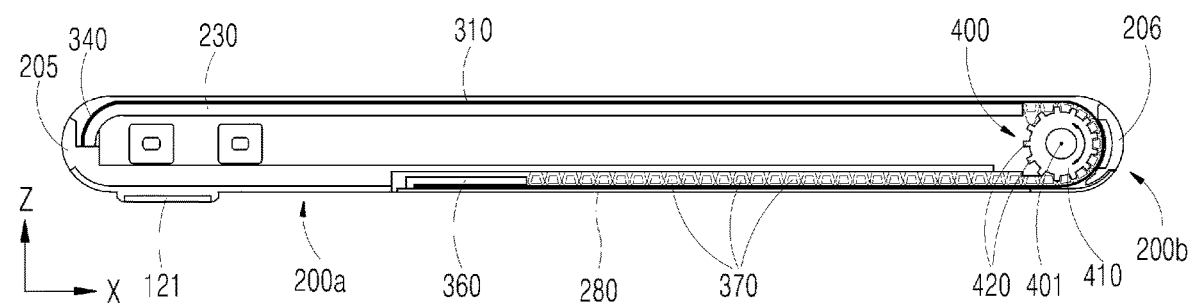
FIG. 6a is a cross-sectional view of FIG. 2a taken along line A-A'.
Figure 6B:
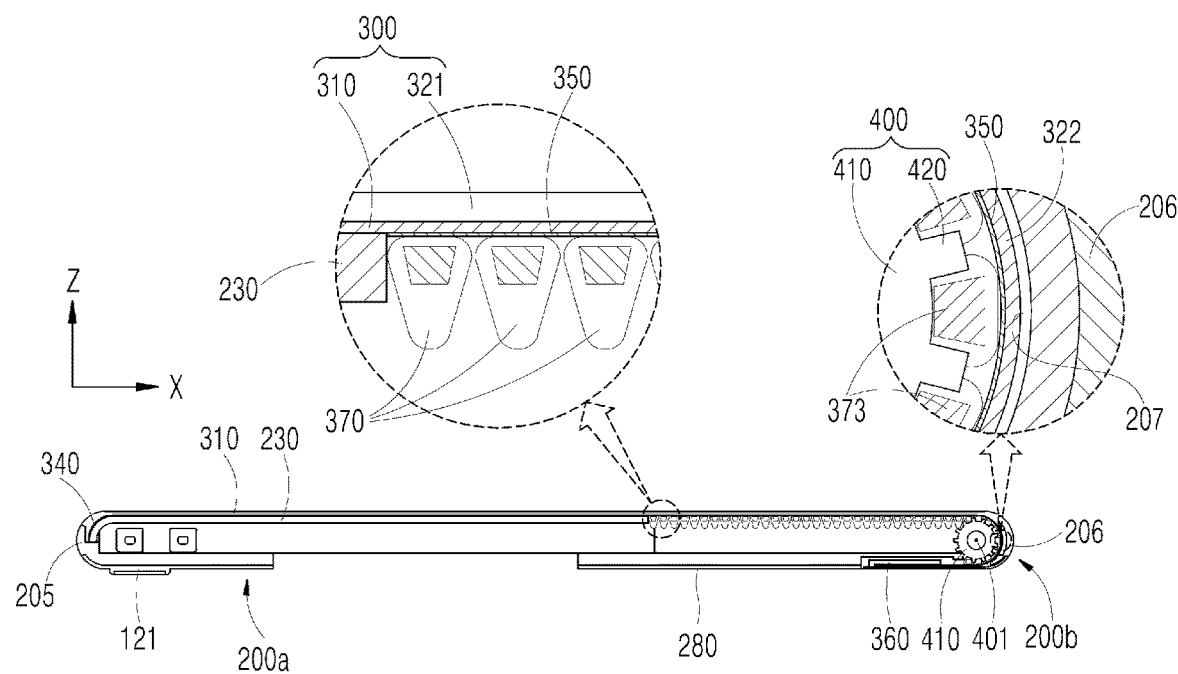
FIG. 6b is a cross-sectional view illustrating a view in which the flexible display device of FIG. 6a is deformed.

FIG. 6a is a cross-sectional view of the flexible display device of FIG. 2a taken along the line A to A'. FIG. 6b is a cross-sectional view of the flexible display device of FIG. 6a when the flexible display device has been deformed.

Figure 7A:
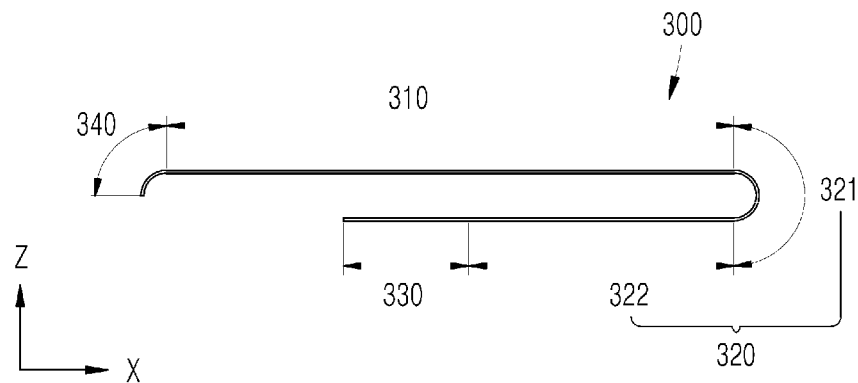
FIG. 7a is a cross-sectional view illustrating the separated flexible display device of FIG. 6a and FIG. 7b is a bottom view illustrating the separated flexible display device of FIG. 6b.
Figure 7B:
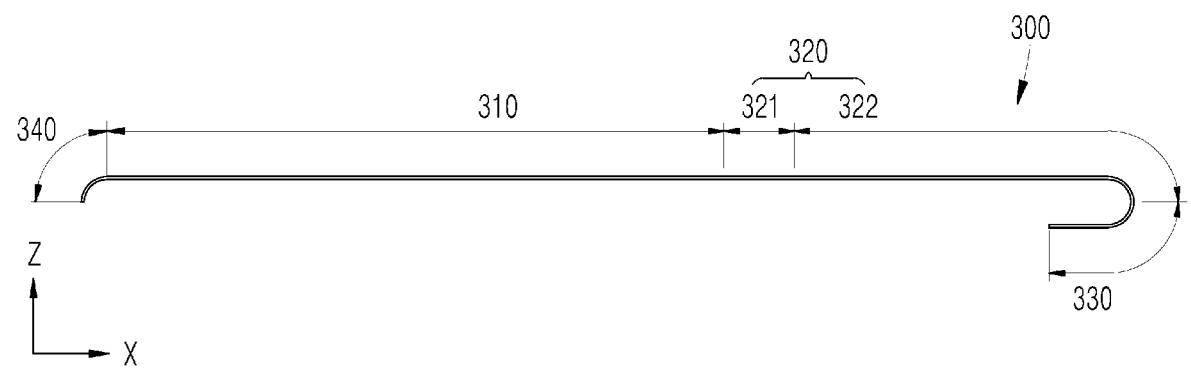

FIG. 7a is a cross-sectional view of the flexible display separated from the flexible display device of FIG. 6a, and FIG. 7b is a cross-sectional view of the flexible display separated from the flexible display device of FIG. 6b.

The support 400 may be fixed to the second body 200b.

The support 400 may be formed along the second direction (Y). The support 400 may be formed to extend in the second direction (Y direction), and may have a constant cross section along the second direction.

In the flexible display device 1, the support 400 may be formed to support a portion of an inner surface of the flexible display 300. That is, a portion of the flexible display 300 may be curved around the support 400, and a direction of formation of the flexible display 300 may be changed along the circumferential direction of the support 400.

The support 400 may be formed to rotate in both directions about a central axis 401 which is parallel to the second direction. That is, the support 400 may be coupled to the second body 200b so as to rotate about the central axis 401.

The support 400 may be formed in the shape of a roller.

The flexible display 300 may be formed in the form of a thin film, and may have an outer surface and an inner surface. The outer surface of the flexible display 300 may be a surface facing an outside of the flexible display device 1, and the inner surface of the flexible display 300 may be a surface facing an inside of the flexible display device 1. An image may be displayed on at least a portion of the outer surface of the flexible display 300.

When the second body 200b moves relative to the first body 200a, the flexible display 300, which is formed such that at least a portion thereof is curved, may change in shape.

The flexible display 300 may include a first region 310 and a second region 320 which are connected to each other.

The flexible display 300 may include a first region 310, a second region 320, and a third region 330, which are sequentially connected. The flexible display 300 may include a fourth region 340.

If the flexible display 300 is not coupled to the body 200 and is spread flat, the fourth region 340, the first region 310, the second region 320, and the third region 330 may form a single plane.

Broken lines shown in FIG. 2b are imaginary lines respectively representing a boundary between the first region 310 and (a first connected region 321 of) the second region 320, a boundary between the first region 310 and the fourth region 340, and a boundary between the first connected region 321 and a second connected region 322.

The first region 310 may have a predetermined area and may be coupled to the body 200 from any one side of the body 200. The first region 310 may be coupled to the first body 200a, and may be fixed to the first body 200a. That is, the first region 310 may be formed so as not to move relative to the first body 200a.

The first region 310 may be parallel to the first and second directions. The first region 310 may be fixed in front of the first body 200a. The first region 310 may be fixed in front of the first body 200a based on the third direction. The first region 310 and the first body 200a may be coupled to each other so as to be parallel to each other.

In an embodiment of the present disclosure, the first region 310 may form a curved surface as a whole. Here, a curvature of the first region 310 may be smaller than a curvature of the first connected region 321, which will be described below, and a radius of curvature of the first region 310 may be greater than a radius of curvature of the first connected region 321. The radius of curvature of the first region 310 may be sufficiently greater than the radius of curvature of the first connected region 321. For example, when the radius of curvature of the first connected region 321 is "a," the radius of curvature of the first region 310 may be "10*a" or greater.

In another embodiment of the present disclosure, the first region 310 may form a plane surface as a whole. The first region 310 may form a planar outer surface of the flexible display 300 and may be disposed on a front surface of the body 200. The first region 310 may have a constant cross section in the first and second directions.

Hereinafter, description will be made on the assumption that the first region 310 of the flexible display device 1 is a plane surface.

A direction the first region 310 faces (i.e. a direction an outer surface of the first region 310 faces) may be the third direction. The first region 310 may form a part or the entirety of the first surface 1a of the flexible display device 1.

The fourth region 340 may extend from the first region 310 and form an end portion of the flexible display 300. The fourth region 340 may have a constant cross section along the second direction, and may form a curved surface. An image may be displayed on the fourth region 340.

The second region 320 may extend from the first region 310, and a portion of the second region 320 may be curved around support 400. That is, a direction of formation of the second region 320 may be changed as the second region 320 passes around the support 400.

The second region 320 may have a constant cross section along the second direction.

A portion of the second region 320 may be curved into a semicircular shape, and a curved position of the second region 320 may change according to movement of the second body 200b. When the second body 200b is in the first position, the first connected region 321 may be curved into a semicircular shape, and when the second body 200b is in the second position, a portion of the second connected region 322 may be curved into a semicircular shape.

The second region 320 may include the first connected region 321 and the second connected region 322.

The first connected region 321 may be directly connected to the first region 310, and the second connected region 322 may be directly connected to the first connected region 321 and the third region 330.

When the second body 200b is in the first position, the first connected region 321 may form a curved surface along the circumferential direction of the support 400.

When the second body 200b is in the first position, the first connected region 321 may form an outer surface of the flexible display 300 that is curved about a curvature center line CL1. When the second body 200b is in the first position, the curvature center line CL1 may be an imaginary straight line that forms a center of curvature of the first connected region 321, and may be parallel to the second direction.

When the second body 200b is in the first position, a cross section of the first connected region 321 may form a semicircular shape.

The curvature center line CL1 may coincide with the central axis 401 of support 400.

When the second body 200b is in the second position, the curvature center line CL1 may be a center of curvature of the second connected region 322 forming a curved surface.

An image may be displayed on the first connected region 321 and the first region 310.

A surface area of the first region 310 may be greater than a surface area of the first connected region 321.

When the second body 200b is in the first position, the second connected region 322 may form an outer surface of the flexible display 300 that is an opposite surface to the first region 310. That is, when the second body 200b is in the first position, and the first region 310 faces the third direction (Z direction), the second connected region 322 may face a direction opposite to the third direction (Z direction). An image may be displayed on the second connected region 322.

The second connected region 322 may have a constant cross section along the second direction. When the second body 200b is in the first position, the second connected region 322 may have a constant cross section along the first direction.

The flexible display 300 may be formed in such a manner that the first region 310, the first connected region 321, and the second connected region 322 are sequentially connected, and when the second body 200b is in the first position, the first region 310, the first connected region 321, and the second connected region 322 may form a U-shape as a whole.

In one embodiment of the present disclosure, when the second body 200b is in the first position, the second connected region 322 may form a curved surface as a whole. Here, a curvature of the second connected region 322 may be smaller than a curvature of the first connected region 321, and a radius of curvature of the second connected region 322 may be greater than a radius of curvature of the first connected region 321. The radius of curvature of the second connected region 322 may be sufficiently greater than the radius of curvature of the first connected region 321. For example, when the radius of curvature of the first connected region 321 is "a," the radius of curvature of the second connected region 322 may be "10*a" or greater.

In another embodiment of the present disclosure, when the second body 200b is in the first position, the second connected region 322 may form a plane surface as a whole. In addition, the second connected region 322 may be parallel to the first region 310. Hereinafter, description will be made on the assumption that when the second body 200b is in the first position, the second connected region 322 forms a plane surface and is parallel to the first region 310.

The third region 330, on the opposite side to the first region 310, may extend from the second region 320. The third region 330 may be formed to extend from the second connected region 322 and may form an end portion of the flexible display 300.

In the flexible display 300, the first region 310, the second region 320, and the fourth region 340 may be configured to display an image thereon, and the third region 330 may be configured not to display an image thereon. In the flexible display 300, the third region 330 may be an extended portion of a display substrate, and may form a dummy portion on which an image is not displayed.

The third region 330 may be formed separately from the flexible display 300 and then be coupled to the flexible display 300. Or, the third region 330 may be formed integrally with the flexible display 300 in the manufacturing process of the flexible display 300. The third region 330 may be formed as a substrate of the flexible display 300.

The third region 330 may be formed in the form of a plastic film, and may be flexibly curved.

The camera 121 may be fixed to a rear surface of the body 200. The camera 121 may be coupled to the body 200 so as to face the direction opposite to the third direction (Z direction).

The camera 121 may be fixed to a rear surface of the first body 200a.

The camera 121 may be fixed to the body 200 at a portion away from the support 400. That is, if the support 400 is coupled to the body 200 at a lower portion of the flexible display device 1, the camera 121 may be coupled to the body 200 at an upper portion of the flexible display device 1. The camera 121 may be fixed to an edge of the first body 200a that is farthest from the support 400.

The camera 121 may be two or more cameras 121 arranged in the second direction.

The first body 200a may include a support plate 230.

The support plate 230 may be formed in a flat plate shape, and may be formed in a size the same as or similar to a size of the first region 310. The support plate 230 may be coupled in a form in which the first region 310 is laminated on an outside (front side) of the support plate 230, and the support plate 230 may support the first region 310 from inside the first region 310.

The first body 200a may include a first edge portion 205.

The first edge portion 205 may form any one edge of the flexible display device 1. The first edge portion 205 may form any one side of the flexible display device 1 having a rectangular shape.

The first edge portion 205 may form an upper side edge of the first body 200a.

The first edge portion 205 may be fixed to the first body 200a. The first edge portion 205 may be integrally formed with the first body 200a, or may be formed separately from the first body 200a and then fixed thereto.

The first edge portion 205 may generally be formed to extend in the second direction (Y direction).

At least a portion of the first edge portion 205 may have a constant cross section in the second direction (Y direction). An outer surface of the first edge portion 205 may form a convex curved surface, and a cross section of the first edge portion 205 may have, for example, a semicircular shape.

The fourth region 340 may be fixed to the first edge portion 205.

The first body 200a may include a first side edge portion 210 and a second side edge portion 220. The first side edge portion 210 and the second side edge portion 220 may form edges on both sides of the first body 200a, and may extend in the first direction. The first side edge portion 210 may be formed over the entire section of any one edge of the first body 200a, or may be formed over a partial section thereof. The second side edge portion 220 may be formed over the entire section of any one edge of the first body 200a, or may be formed over a partial section thereof.

The first side edge portion 210 and the second side edge portion 220 may be formed to be parallel to the first direction, and may have constant cross sections in the first direction. If the first side edge portion 210 forms a left side edge of the first body 200a, the second side edge portion 220 may form a right side edge of the first body 200a.

The second body 200b may include a second edge portion 206.

The second edge portion 206 may form an edge of the flexible display device 1 on the opposite side of the flexible display device 1 to the first edge portion 205. If the first edge portion 205 forms an upper side edge of the flexible display device 1, the second edge portion 206 may form a lower side edge of the flexible display device 1.

The second edge portion 206 may be disposed at an outer side of the support 400.

Between the second edge portion 206 and the support 400, a gap 207, which is relatively narrow, may be provided, and through the gap 207, the flexible display 300 may move, forming a curved surface (see FIGS. 6a and 6b).

In addition, a connection arm 373 of the support bar 370 may move through the gap 207.

The second edge portion 206 may be fixed to the second body 200b. The second edge portion 206 may be integrally formed with the second body 200b, or may be formed separately from the second body 200b and then fixed thereto.

The second edge portion 206 may generally be formed to extend in the second direction (Y direction).

At least a portion of the second edge portion 206 may have a constant cross section along the second direction (Y direction). An outer surface of the second edge portion 206 may form a convex curved surface, and a cross section of the second edge portion 206 may have a semicircular shape.

The second body 200b may include a third side edge portion 250 and a fourth side edge portion 260. The third side edge portion 250 and the fourth side edge portion 260 may form edges on both sides of the second body 200b, and may be formed to extend in the first direction. The third side edge portion 250 and the fourth side edge portion 260 may be formed to be parallel to the first direction, and may have constant cross sections along the first direction.

If the third side edge portion 250 forms a left side edge of the second body 200b, the fourth side edge portion 260 may form a right side edge of the second body 200b.

The third side edge portion 250 may be disposed to align with the first side edge portion 210, and may be disposed so as to come into close contact with the first side edge portion 210 or to be close thereto.

The third side edge portion 250 may be disposed at an outer side of the first side edge portion 210 or at an inner side of the first side edge portion 210.

The fourth side edge portion 260 may be disposed to align with the second side edge portion 220, and may be disposed so as to come into close contact with the second side edge portion 220 or to be close thereto.

The fourth side edge portion 260 may be disposed at an outer side of the second side edge portion 220 or at an inner side of the second side edge portion 220.

The flexible display device 1 may include a back cover 280.

The back cover 280 may be formed in a shape of a plate that is substantially parallel to the first direction (X direction) and the second direction (Y direction). The back cover 280 may be parallel to or substantially parallel to the first region 310.

The back cover 280 may form a rear surface of the second body 200b. The back cover 280 may be fixed to the second body 200b or may be detachably coupled to the second body 200b.

The back cover 280 may be formed to be transparent or opaque.

When the second body 200b is in the first position, a surface area of the back cover 280 may correspond to a surface area of the second connected region 322, or may be equal to or greater than the surface area of the second connected region 322.

When the back cover 280 is formed to be transparent, an image displayed on the second connected region 322 while the second body 200b is in the first position may be seen through the back cover 280.

The flexible display device 1 according to the embodiment of the present disclosure may include a plurality of support bars 370.

Each of the plurality of support bars 370 may be formed to extend generally in the second direction, and may be fixed to an inner surface of the second region 320. The plurality of support bars 370 may be directly fixed to the second region 320, or may be fixed thereto by means of a separate element.

Each of the plurality of support bars 370 may support the first connected region 321 or the second connected region 322 from inside the first connected region 321 or the second connected region 322, and the plurality of support bars 370 may be disposed one by one along the first connected region 321 and the second connected region 322.

Each of the plurality of support bars 370 may be disposed to be parallel to one another.

The plurality of support bars 370 may be made of a relatively hard material so as to support the flexible display 300. The plurality of support bars 370 may be made of plastic or metal.

The flexible display device 1 may further include an inner plate 350.

The inner plate 350 may be coupled in a form in which the inner plate 350 is stacked on an inner surface of the flexible display 300.

The inner plate 350 may be formed of a metal plate having elasticity. The inner plate 350 may include a superelastic metal. The inner plate 350 may be formed in a shape of a relatively thin plate. The inner plate 350 may have a thickness in the range of 0.05 mm to 0.2 mm, and may have a thickness of 0.1 mm.

According to an embodiment of the present disclosure, the inner plate 350 may be formed in the same or similar size and in the same or similar shape as the flexible display 300 such that the inner plate 350 is coupled to an entire inner surface of the flexible display 300.

According to another embodiment of the present disclosure, the inner plate 350 may be formed in the same or similar size and in the same or similar shape as the second region 320 such that the inner plate 350 is coupled to an inner surface of the second region 320.

The inner plate 350 may facilitate elastic deformation and elastic recovery of the flexible display 300.

When the inner plate 350 is provided in the flexible display device 1, the plurality of support bars 370 may be coupled to the flexible display 300 by means of the inner plate 350. That is, the inner plate 350 may be fixed to the inner surface of the flexible display 300, and the plurality of support bars 370 may be fixed to an inner surface of the inner plate 350.

The flexible display device 1 may further include a sliding plate 360.

The sliding plate 360 may generally be formed in a shape of a flat plate extending along the second direction. The sliding plate 360 may be made of metal, plastic, and the like.

The sliding plate 360 may be fixed to an end portion of the flexible display 300. The sliding plate 360 may be fixed to the third region 330.

The sliding plate 360 may be coupled to the second body 200b such that the sliding plate 360 moves relative to the second body 200b along the first direction.

The sliding plate 360 may be slidably coupled to the second body 200b, and for this, both end portions of the sliding plate 360 may respectively be inserted into a first rear guide groove 252 and a second rear guide groove 262 and move therein.

Figure 8A:
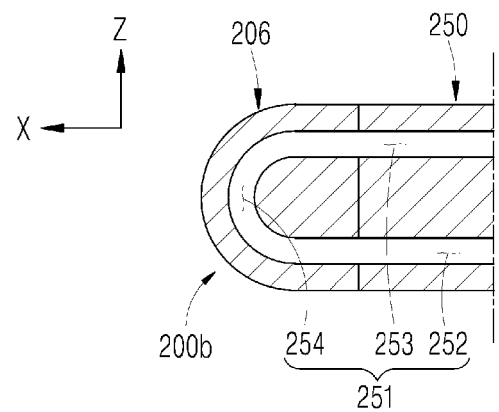
FIG. 8a is a cross-sectional view illustrating inner surface sides of a third side edge portion and a second edge portion and FIG. 8b is a cross-sectional view illustrating inner surface sides of a fourth side edge portion and the second edge portion.
Figure 8B:
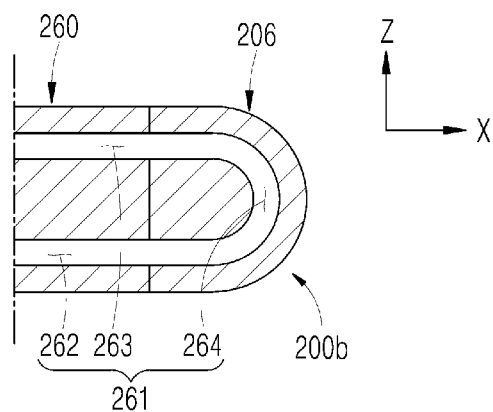

FIG. 8a is a cross-sectional view illustrating inner surfaces of the third side edge portion 250 and the second edge portion 206, and FIG. 8b is a cross-sectional view illustrating inner surfaces of the fourth side edge portion 260 and the second edge portion 206.

Figure 9:
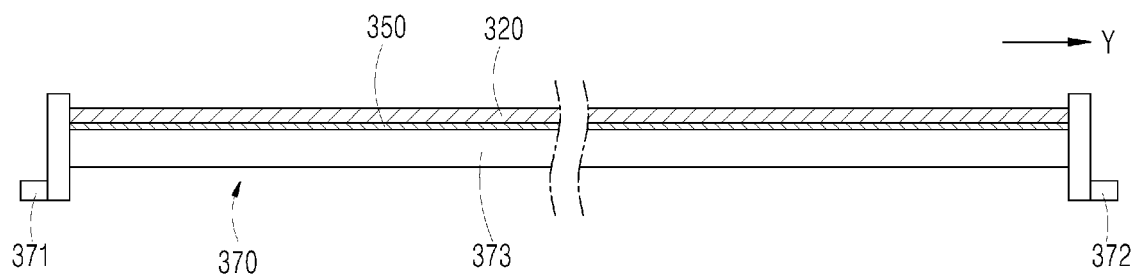
FIG. 9 is a cross-sectional view schematically illustrating a view in which a support bar, an inner plate, and a flexible display are coupled.

FIG. 9 is a cross-sectional view schematically illustrating a state in which the support bar 370, the inner plate 350, and the flexible display 300 are coupled.

The second body 200b may include a first movement guide groove 251 and a second movement guide groove 261.

The first movement guide groove 251 may be formed as a U-shaped groove, and may form a path into which a first support slider 371, which will be described below, is inserted and moves therein.

The second movement guide groove 261 may be formed as a U-shaped groove, and may form a path into which a second support slider 372, which will be described below, is inserted and moves therein.

The first movement guide groove 251 may include a first rear guide groove 252, a first front guide groove 253, and a first connection guide groove 254.

The second movement guide groove 261 may include a second rear guide groove 262, a second front guide groove 263, and a second connection guide groove 264.

The first rear guide groove 252 and the first front guide groove 253 may be formed in the third side edge portion 250, and the second rear guide groove 262 and the second front guide groove 263 may be formed in the fourth side edge portion 260.

In one embodiment of the present disclosure, the first connection guide groove 254 may be formed in the third side edge portion 250, and the second connection guide groove 264 may be formed in the fourth side edge portion 260. In another embodiment of the present disclosure, the first connection guide groove 254 and the second connection guide groove 264 may be formed in the second edge portion 206.

The first rear guide groove 252 may form a space inside the third side edge portion 250, may have a constant cross section along the first direction, and may be formed to be open inwards from a rear side of the third side edge portion 250.

The first front guide groove 253 may form a space inside the third side edge portion 250, may have a constant cross section along the first direction, and may be formed to be open inwards from a front side of the third side edge portion 250. The first front guide groove 253 may be symmetric with respect to the first rear guide groove 252.

The first connection guide groove 254 may form a semicircular-shaped space inside the second edge portion 206 of the second body 200b and may connect the first rear guide groove 252 to the first front guide groove 253.

The first rear guide groove 252, the first connection guide groove 254, and the first front guide groove 253 may form a U-shaped space together, and may form a movement path of the plurality of support bars 370 (in particular, the first support slider 371) to serve as a rail, which will be described below.

The second rear guide groove 262 may form a space inside the fourth side edge portion 260, may have a constant cross section along the first direction, and may be formed to be open inwards from a rear side the fourth side edge portion 260.

The second front guide groove 263 may form a space inside the fourth side edge portion 260, may have a constant cross section along the first direction, and may be formed to be open inwards from a front side of the fourth side edge portion 260. The second front guide groove 263 may be symmetric with respect to the second rear guide groove 262.

The second connection guide groove 264 may form a semicircular-shaped space inside the second edge portion 206 of the second body 200b and may connect the second rear guide groove 262 to the second front guide groove 263.

The second rear guide groove 262, the second connection guide groove 264, and the second front guide groove 263 may form a U-shaped space together, and may form a movement path of the plurality of support bars 370 (in particular, the second support slider 372) to serve as a rail, which will be described below.

The first rear guide groove 252, the first front guide groove 253, and the first connection guide groove 254 may respectively be symmetric to the second rear guide groove 262, the second front guide groove 263, and the second connection guide groove 264.

Each of the plurality of support bars 370 may be formed to extend in the second direction (Y direction) as a whole.

Each of the plurality of support bars 370 may include a first support slider 371, a second support slider 372, and a connection arm 373.

The first support slider 371 may form an end portion of the plurality of support bars 370 at one side thereof.

The first support slider 371 may be inserted into the first rear guide groove 252, the first connection guide groove 254, and the first front guide groove 253, so as to move along the space (path) formed by the first rear guide groove 252, the first connection guide groove 254, and the first front guide groove 253.

The second support slider 372 may form the other end portion of the plurality of support bars 370 in the opposite side to the first support slider 371.

The second support slider 372 may be inserted into the second rear guide groove 262, the second connection guide groove 264, and the second front guide groove 263, so as to move along the space (path) formed by the second rear guide groove 262, the second connection guide groove 264, and the second front guide groove 263.

The connection arm 373 may have a constant cross section along the second direction (Y direction).

The connection arm 373 may connect the first support slider 371 to the second support slider 372, may support an inner surface of the flexible display 300, and may assist in maintaining the first connected region 321 and the second connected region 322 in a stable plane surface or curved surface.

The connection arm 373 may be formed in such a shape that a cross section thereof is a trapezoid (i.e. in a shape in which a width of the connection arm 373 becomes increasingly smaller away from a rear surface of the flexible display 300).

The plurality of support bars 370 may have a predetermined thickness such that when the plurality of support bars 370, which are successively arranged, form a plane parallel to the first region 310, the second region 320, which is supported by the plurality of support bars 370, are maintained stable like the first region 310.

A front surface of the connection arm 373 and a front surface of the support plate 230 may form a single plane.

The second region 320 may be maintained in a stable state by means of the plurality of support bars 370. In particular, when the second region 320 is formed as a touch screen to receive a touch input, the second region 320 may be stably supported by the plurality of support bars 370.

The support 400 may be configured to include a support body 410 and a locking protrusion 420.

The support body 410 forms a center body of the support 400. The support body 410 may have a section which is formed in a constant shape in the second direction. The support body 410 may have a cylindrical shape.

The respective locking protrusions 420 are configured in a form to protrude in a radial direction on the outer peripheral surface of the support body 410, and a plurality of locking protrusion 420 are repeatedly formed in a circumferential direction of the support body 410. As a result, the locking protrusion 420 is formed to be repeatedly formed in the circumferential direction of the support 400 on the outer peripheral surface of the support 400.

A connection arm 373 of the support bar 370 may be engaged with the locking protrusion 420 of the support 400 to be locked to each other (the locking protrusion 420 and the connection arm 373 may be engaged with each other so that each connection arm 373 is positioned between the respective locking protrusion 420), and when the support bar 370 moves around the support 400, movement of the support bar 370 and rotation of the support 400 may be jointly achieved.

Figure 10:
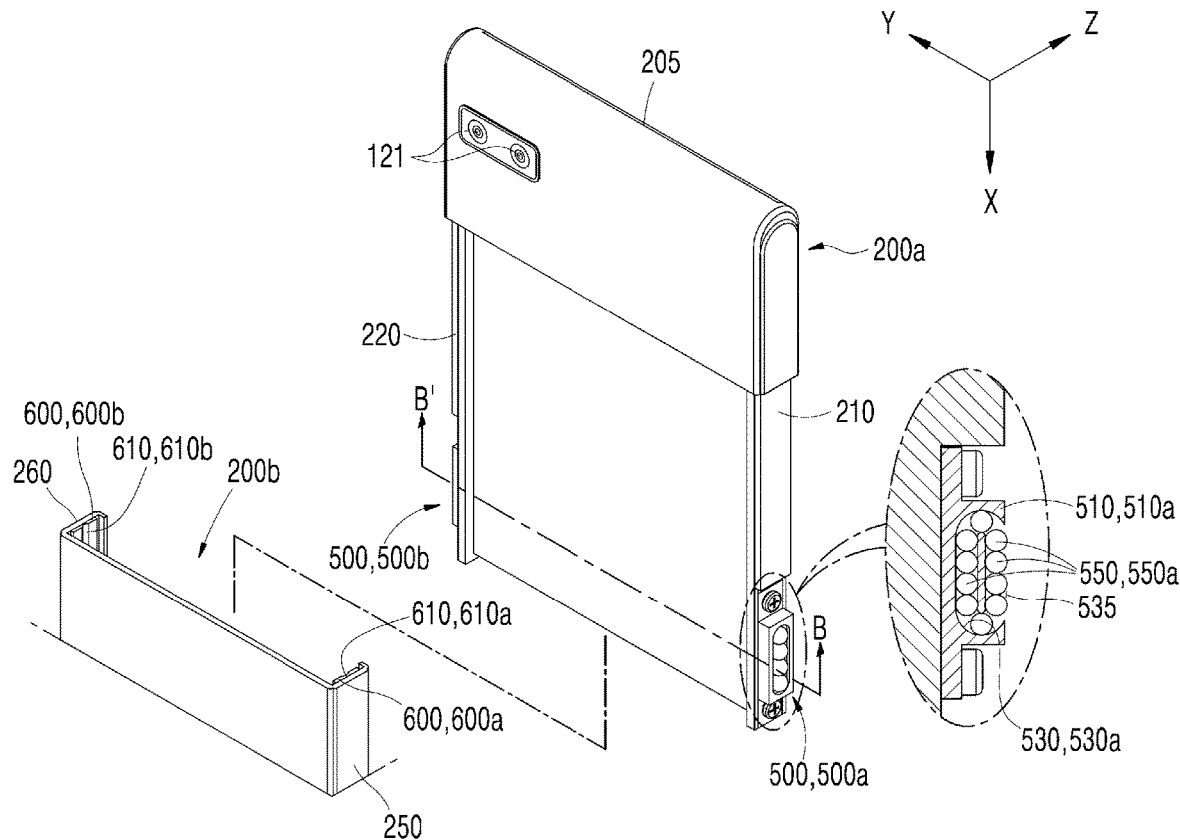
FIG. 10 is a perspective view schematically illustrating a view of a flexible display device in which a first body and a second body are separated. Only a part of the first body is illustrated in FIG. 10.

FIG. 10 is a perspective view schematically illustrating a view of a flexible display device 1 in which a first body 200a and a second body 200b are separated. Only a part of the first body 200a is illustrated.

Figure 11:
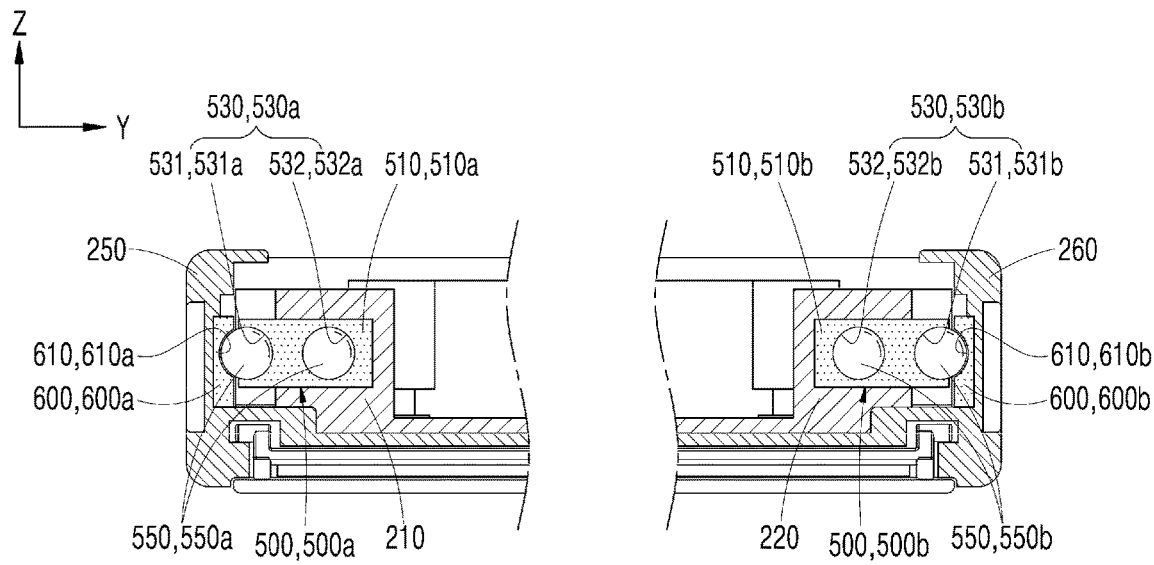
FIG. 11 is a cross-sectional view illustrating a flexible display device at a portion where a ball module is coupled.

FIG. 11 is a cross-sectional view illustrating a flexible display device 1 at a portion where a ball module 500 is coupled. FIG. 11, as an approximate cross-sectional view of FIG. 10 taken along line B-B', is a cross-sectional view in a state in which the first body 200a and the second body 200b are coupled.

Figure 12:
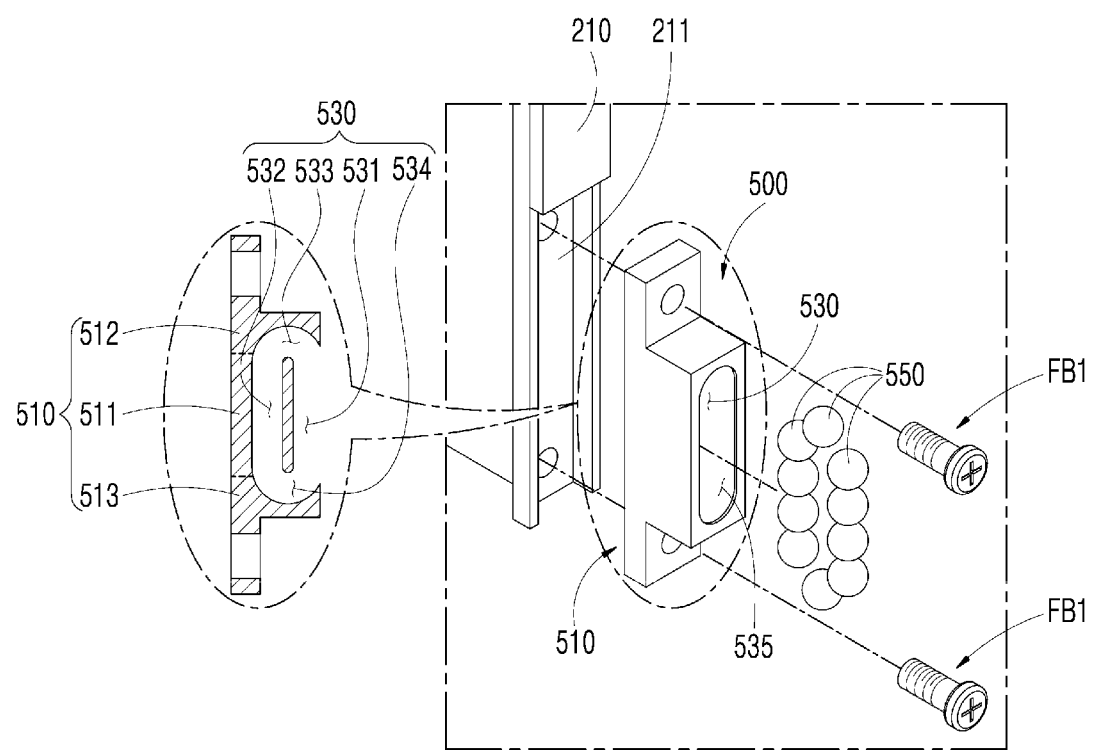
FIG. 12 is a perspective view illustrating a view in which a case and a moving ball are separated from the first body.

FIG. 12 is a perspective view illustrating a view in which a case 510 and a moving ball 550 are separated from the first body 200a.

The flexible display device 1 is configured to include a case 510, a rail 600, and a plurality of moving balls 550. The case 510 and the plurality of moving balls 550 are combined with each other to constitute the ball module 500. That is, the flexible display device 1 is configured to include the ball module 500.

The case 510 is configured to be long in the first direction X. That is, the case 510 has a length of the first direction X larger than a length of the second direction Y and a length of the third direction Z.

In describing the present disclosure, unless particularly limited, 'A being long in direction B' means 'the length of A in direction B being larger than the lengths of A in directions other than direction B'.

A circulation path 530 which is a circulating passage form is formed inside the case 510. The circulation path 530 may have a circular form as a whole, or have a long elliptical form in the first direction X. The circulation path 530 may have a long track form in the first direction X.

The circulation path 530 is an internal space of the case 510, and accommodates the moving balls 550 and serves as a passage in which the moving balls 550 move. Therefore, one moving ball 550 accommodated in the circulation path 530 moves along a path formed by the circulation path 530, and the moving ball 550 which is circulated at a lap returns to an initial location again.

One moving ball 550 accommodated in the circulation path 530 may be in point-contact with the circulation path 530 (the inner surface of the case 510).

The section of the circulation path 530 at a specific spot on the path may be a circle or may be configured in the circular form as a whole.

A part of the circulation path 530 formed inside the case 510 is configured to be exposed to the outside. That is, an opening 535 is formed in the case 510, and the opening 535 is in communication with the circulation path 530. A width of the opening 535 is configured to be a little smaller than a diameter of the moving ball 550 so as to prevent the moving ball 550 from being separated to the outside of the case 510.

The rail 600 is configured to be long in the first direction X. The length of the rail 600 is configured to be larger than the length of the case 510 in the first direction X. The length of the rail 600 in the first direction X is configured to be larger than a movement distance when the second body 200b moves from the first position to the second position (see FIG. 4).

A sliding groove 610 parallel to the first direction X is formed in the rail 600.

The sliding groove 610 is configured in a concave groove form so as to accommodate a part of each moving ball 550. The sliding groove 610 may be configured to be long in the first direction X, and the section may be configured to be constant in the first direction X.

The sliding groove 610 is configured to be long in the first direction X. The length of the sliding groove 610 in the first direction X is configured to be larger than the length of the case 510. The length of the sliding groove 610 in the first direction X is configured to be larger than a movement distance when the second body 200b moves from the first position to the second position.

Each of the plurality of moving balls 550 is configured in a ball shape. The plurality of moving balls 550 may be configured to have the same size and material. The plurality of moving balls 550 is inserted into the circulation path 530 and arranged to be movable along the circulation path 530.

The moving ball 550 inserted into the circulation path 530 may be configured to be in contact with an adjacent moving ball 550.

Some moving balls 550 of the moving balls 550 inserted into the circulation path 530 slightly protrude to the outside through the opening 535 of the case 510. As a result, some moving balls 550 inserted into the circulation path 530 is in contact with the sliding groove 610 through the opening of the case 510. In this case, the moving balls 550 may be in point-contact with the sliding groove 610.

The case 510 and the rail 600 are configured to move relatively to each other in a direction parallel to the first direction X. In this case, the moving ball 550 which is in contact with the sliding groove 610 of the rail 600 rolls and moves along the sliding groove 610 and moreover, rolls and moves along the circulation path 530. In addition, each moving ball 550 inserted into the circulation path 530 pushes another adjacent moving ball 550, and as a result, the moving balls 550 are circulated in the circulation path 530.

By such a configuration, slip between the moving ball 550 of the ball module 500 and the sliding groove 610 of the rail 600 is prevented or minimized, and slip between the moving ball 550 and the circulation path 530 is prevented or minimized.

In the flexible display device according to the embodiment of the present disclosure, any one of the case 510 and the rail 600 is fixed to the first body 200a and the other one is fixed to the second body 200b.

In an embodiment, the case may be fixed to the second body and the rail may be fixed to the first body. In this case, the case may be configured integrally with the second body or separately configured, and then fixed to the second body by a fixation means (e.g., bolt), and the rail may be configured integrally with the first body or separately configured, and then fixed to the first body by the fixation means (e.g., bolt).

In another embodiment, the case 510 may be fixed to the first body 200a and the rail 600 may be fixed to the second body 200b. In this case, the case 510 may be configured integrally with the first body 200a or separately configured, and then fixed to the first body 200a by a fixation means FB1 (e.g., bolt), and the rail 600 may be configured integrally with the second body 200b or separately configured, and then fixed to the second body 200b by the fixation means (e.g., bolt).

The case 510 may be fixed to an end portion of the first body 200a close to the support 400 based on the first direction X. As a result, a movement range (stroke) of the rail 600 relatively to the case 510 may be maximized and a movement range (stroke) of the second body 200b relatively to the first body 200a may be maximized.

Since the rail 600 may be formed to be comparatively thinner than the case 510, when the case 510 is fixed to or configured integrally with the first body 200a or the rail 600 is fixed to or configured integrally with the second body 200b, it is possible to prevent both left and right bezel portions of the flexible display device 1 from being thicker.

In an embodiment, the rail 600 and the ball module 500 are formed at both sides of the flexible display device 1, respectively.

The circulation path 530 may be divided into an outer path 531, an inner path 532, an upper path 533, and a lower path 534.

The outer path 531 is configured to be long in the first direction X. The outer path 531 is opened outward and faces the sliding groove 610. Therefore, the section of the outer path 531 is not a completely circle, but is configured in a form in which a part is deleted from the circle.

The inner path 532 is configured to be long in the first direction X. The inner path 532 is parallel to the outer path 531 and formed inside the case 510. The section of the outer path 531 is configured in a complete circular form.

The upper path 533 connects the outer path 531 and the inner path 532. The upper path 533 forms a path switched between the outer path 531 and the inner path 532. The upper path 533 is configured in a curve form. The upper path 533 may be formed in a semi-circular form. The section of the upper path 533 is configured in the circular form.

The lower path 534 connects the outer path 531 and the inner path 532 at an opposite side to the upper path 533. The lower path 534 forms a path switched between the outer path 531 and the inner path 532. The lower path 534 is configured in the curve form. The upper path 534 may be formed in a semi-circular form. The section of the lower path 534 is configured in the circular form.

In the first direction X, the length of each of the outer path 531 and the inner path 532 may be configured to be 3 times larger and 10 times smaller tan the diameter of the moving ball 550. In an embodiment, the length of each of the outer path 531 and the inner path 532 may be configured to be 5 times of the diameter of the moving ball 550, and in another embodiment, the length of each of the outer path 531 and the outer path 532 may be configured to be 8 times of the diameter of the moving ball 550.

A width between the center of the outer path 531 and the center of the inner path 532 may be configured to be larger than the diameter of the moving ball 550 and smaller than twice of the diameter of the moving ball 550. In an embodiment, the width between the center of the outer path 531 and the center of the inner path 532 may be configured to be approximately 1.5 times of the moving ball 550.

The case 510 is configured to include a central case 511, an upper case 512, and a lower case 513.

The central case 511 is a central portion of the case 510, and the outer path 531 and the inner path 532 are formed in the central case 511.

The upper case 512 and the lower case 513 are at both end portions of the case 510, and the upper path 533 is formed in the upper case 512 and the lower path 534 is formed in the lower case 513. Each of the upper case 512 and the lower case 513 may be detachably coupled to the central case 511.

In the flexible display device 1, the first body 200a and the second body 200b are connected by mediating the moving ball 550. Even when the first body 200a and the second body 200b move relatively to each other, the moving ball 550 mediates the connection of the first body 200a and the second body 200b.

Therefore, a load applied from the first body 200a may be delivered to the second body 200b via the moving ball 550, and a load applied from the second body 200b may be delivered to the first body 200a via the moving ball 550.

As described above, in the flexible display device 1, when the flexible display 300 is deformed while the first body 200a and the second body 200b move slidably to each other, the plurality of moving balls 550 does not slide in the sliding groove 610 ad the circulation path 530, but may move along the circulation path 530 while rolling-contacting the sliding groove 610 without slip in the circulation path 530.

As a result, frictional force (kinetic frictional force) generated between the moving ball 550 and the sliding groove 610 and frictional force (kinetic frictional force) generated between the moving ball 550 and the circulation path 530 may be remarkably reduced, and the soft operation of the flexible display device 1 may be achieved.

Figure 13:
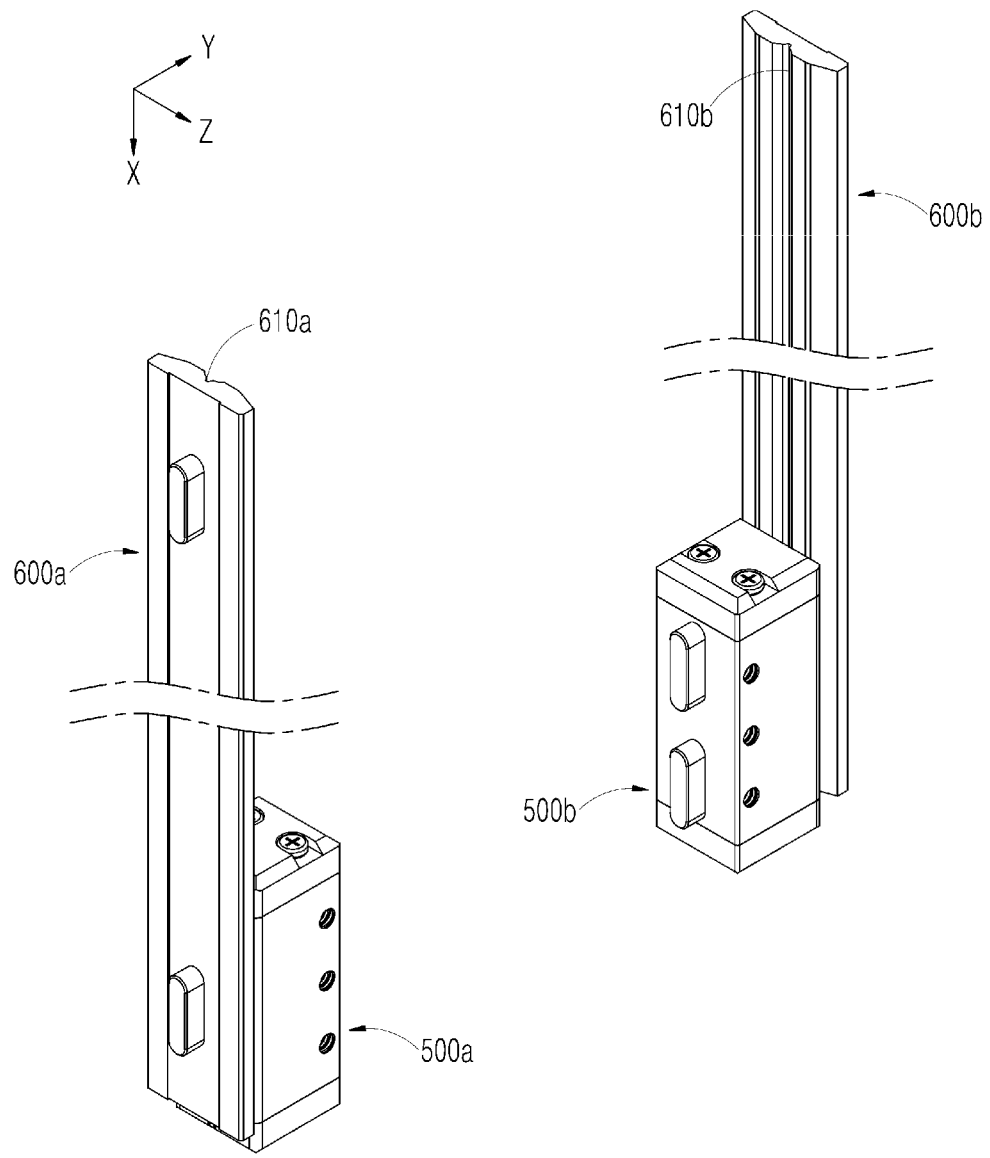
FIG. 13 is a perspective view illustrating a first ball module, a first rail, a second ball module, and a second rail illustrated in FIG. 4.

FIG. 13 is a perspective view illustrating a first ball module 500a, a first rail 600a, a second ball module 500b, and a second rail 600b illustrated in FIG. 4.

Figure 14A:
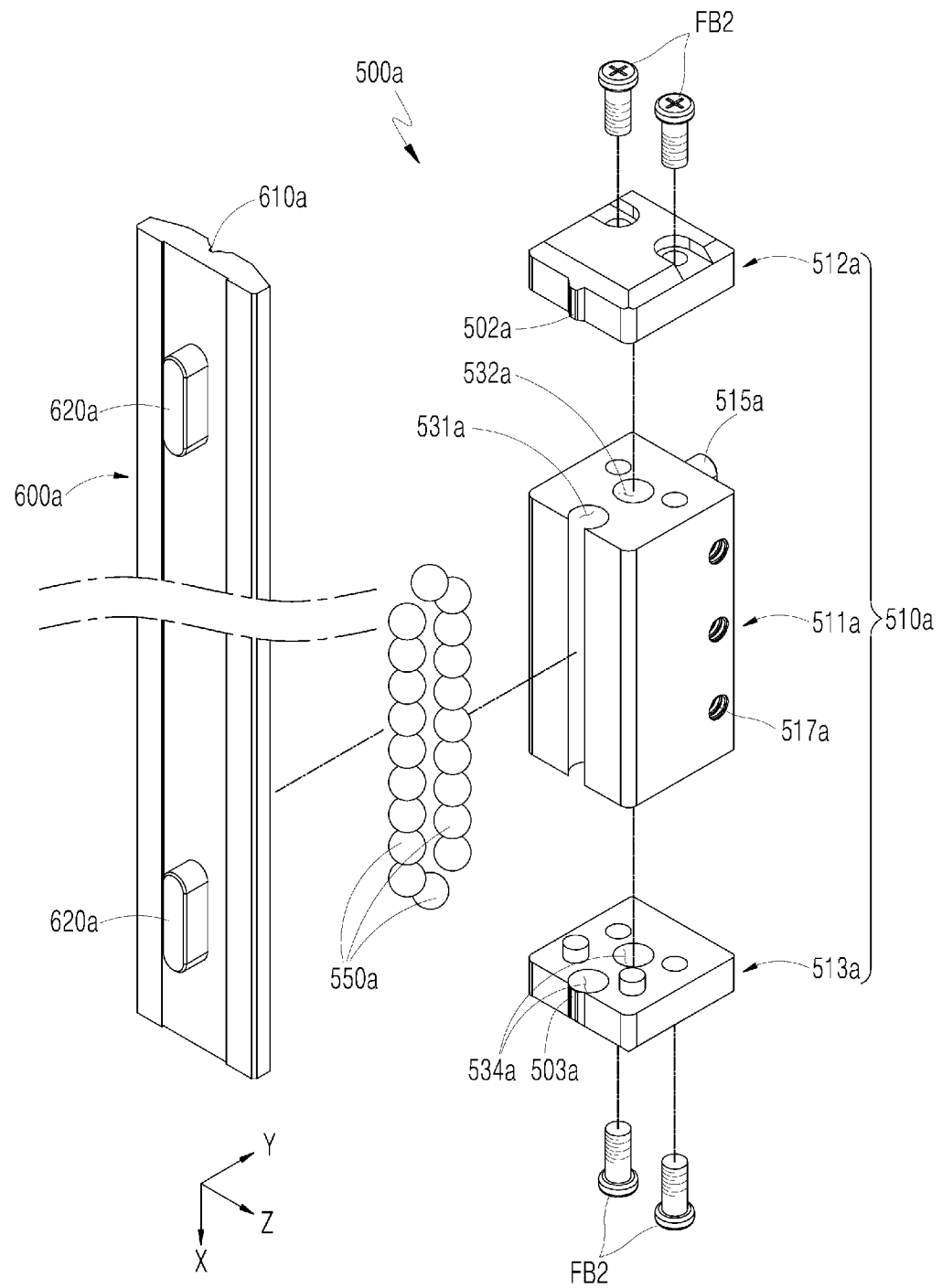
FIG. 14a is an exploded perspective view illustrating the first ball module and the first rail of FIG. 13
Figure 14B:
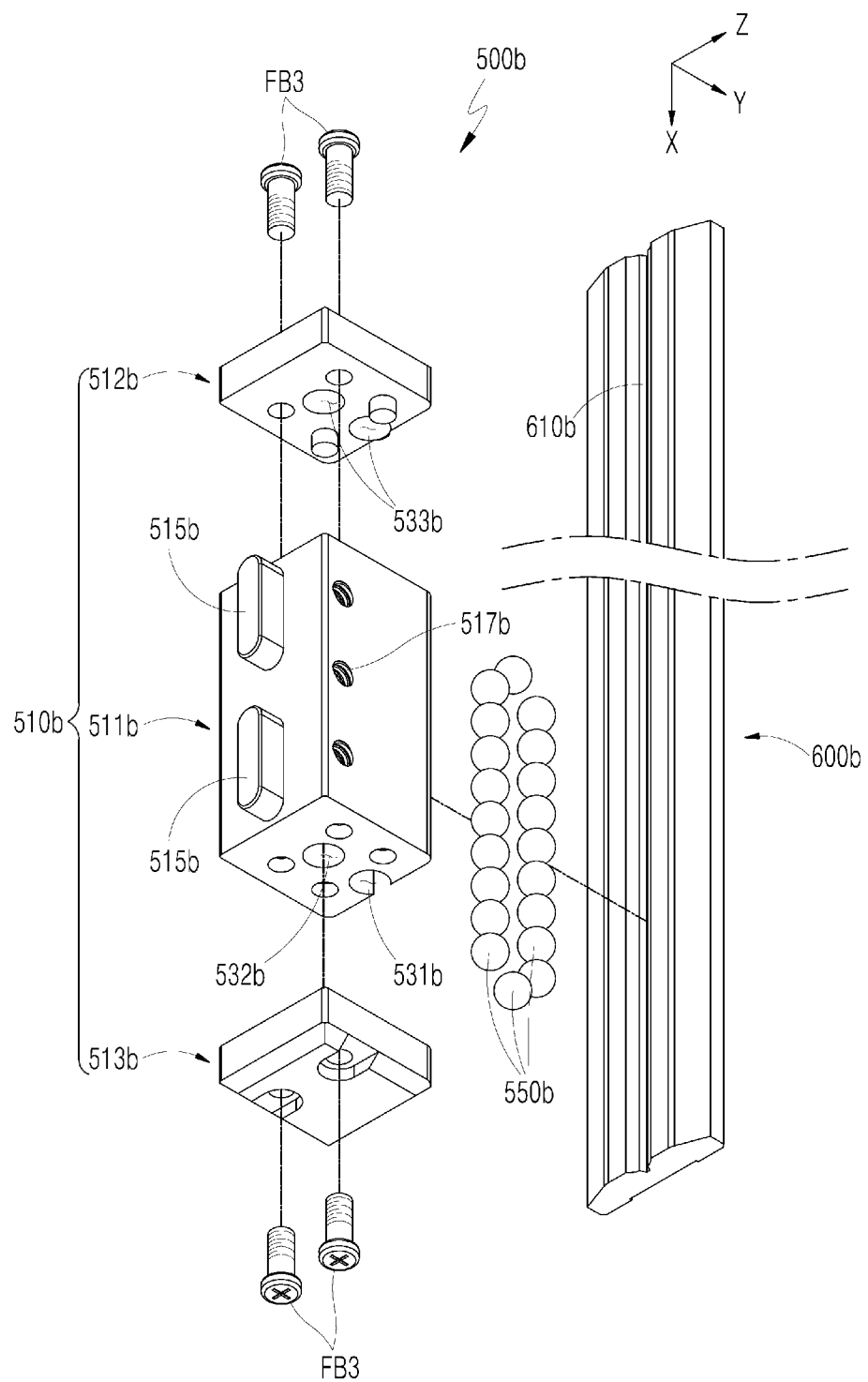
FIG. 14b is an exploded perspective view illustrating the second ball module and the second rail of FIG. 13.

FIG. 14a is an exploded perspective view illustrating the first ball module 500a and the first rail 600a of FIG. 13 and FIG. 14b is an exploded perspective view illustrating the second ball module 500b and the second rail 600b of FIG. 13.

Figure 15A:
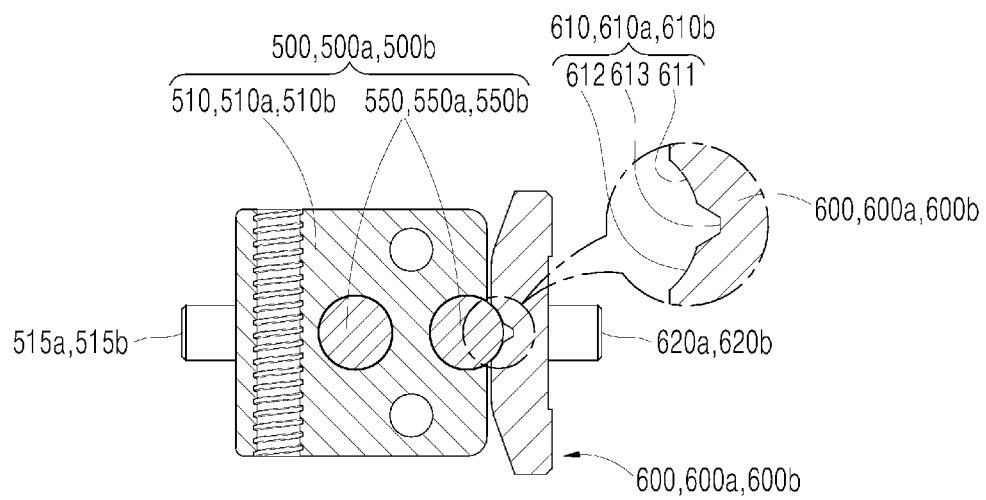
FIG. 15a is a transverse cross-sectional view illustrating the first ball module and the first rail (or the second ball module and the second rail) of FIG. 13
Figure 15B:
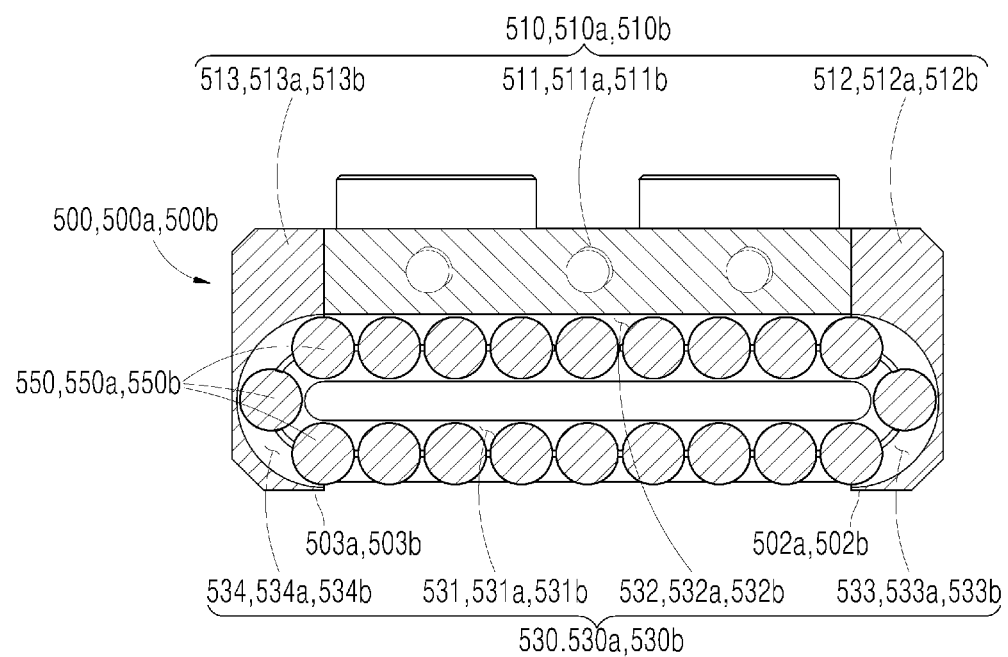
FIG. 15b is a longitudinal cross-sectional view illustrating the first ball module (or the second ball module) of FIG. 13.

FIG. 15a is a transverse cross-sectional view illustrating the first ball module 500a and the first rail 600a (or the second ball module 500b and the second rail 600b) of FIG. 13 and FIG. 15b is a longitudinal cross-sectional view illustrating the first ball module 500a (or the second ball module 500b) of FIG. 13.

Figure 16:
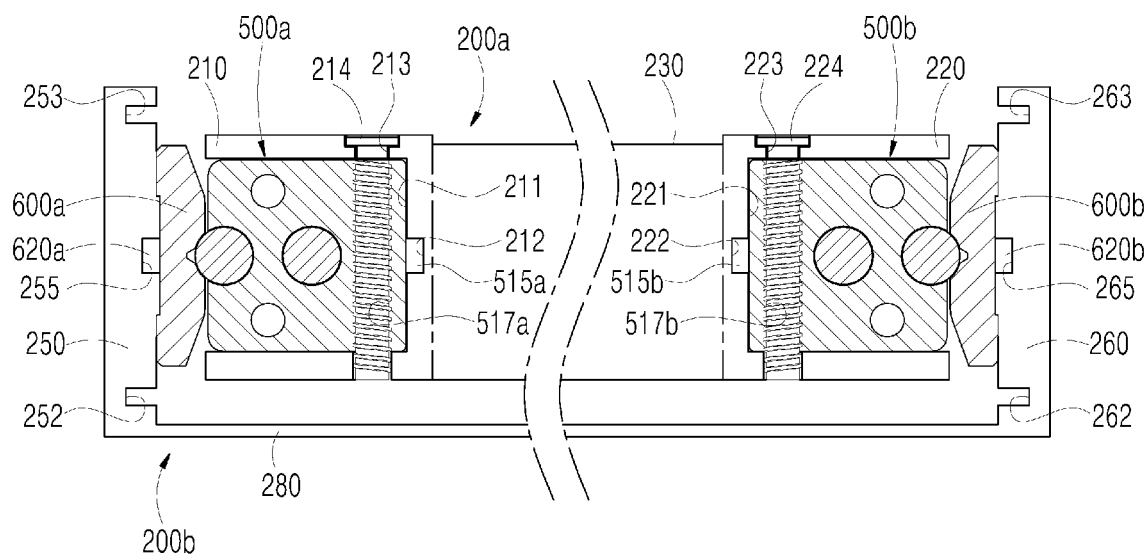
FIG. 16 is a cross-sectional view schematically illustrating the flexible display device at a portion where the first ball module, the first rail, the second ball module, and the second rail are coupled.

FIG. 16 is a cross-sectional view schematically illustrating the flexible display device 1 at a part where the first ball module 500a, the first rail 600a, the second ball module 500b, and the second rail 600b are coupled.

In the flexible display device 1 according to an embodiment, the third side edge portion 250 is positioned at an outer side of the first side edge portion 210, and the fourth side edge portion 260 is positioned at an outer side of the second side edge portion 220. The first side edge portion 210 and the second side edge portion 220 are positioned between the third side edge portion 250 and the fourth side edge portion 260. The third side edge portion 250 faces the first side edge portion 210, and the fourth side edge portion 260 faces the second side edge portion 220.

The flexible display device 1 is configured to include the first ball module 500a, the first rail 600a, the second ball module 500b, and the second rail 600b. Each of the first ball module 500a and the second ball module 500b may be configured in the same structure and form as the ball module 500. Each of the first rail 600a and the second rail 600b may be configured in the same structure and form as the rail 600.

The first ball module 500a and the second ball module 500b may be symmetric to each other based on a central surface CS crossing the flexible display device 1, which is parallel to the first direction X. When the first ball module 500a is coupled to a left portion of the flexible display device 1, the second ball module 500b is coupled to a right portion of the flexible display device 1, and in this case, the first ball module 500a and the second ball module 500b are symmetric to each other.

The first rail 600a and the second rail 600b may be symmetric to each other based on the central surface CS. When the first rail 600a is coupled to the left portion of the flexible display device 1, the second rail 600b is coupled to the right portion of the flexible display device 1, and in this case, the first rail 600a and the second rail 600b are symmetric to each other.

The first ball module 500a is configured to include a plurality of first moving balls 550a. The first moving ball 550a is configured to have the same form as the moving ball 550.

The plurality of first moving balls 550a is arranged to be movable along the first circulation path 530a which is a passage form circulated between the first side edge portion 210 and the third side edge portion 250.

The second ball module 500b is configured to include a plurality of second moving balls 550b. The second moving ball 550b is configured to have the same form as the moving ball 550.

The plurality of second moving balls 550b is arranged to be movable along the second circulation path 530b which is the passage form circulated between the second side edge portion 220 and the fourth side edge portion 260.

The first ball module 500a is configured to include a first case 510a.

The first case 510a may be configured to have the same form and structure as the case 510. A first circulation path 530a may be formed in the first case 510a, and the first circulation path 530a may be configured to have the form and structure as the circulation path 530. The first case 510a may be fixed to the outer surface of the first side edge portion 210.

The first rail 600a may be configured to have the same form and structure as the rail 600. A first sliding groove 610a is formed in the first rail 600a. The first sliding groove 610a may be configured to have the same form and structure as the sliding groove 610.

The first sliding groove 610a may be formed on the inner surface of the first rail 600a, and the first rail 600a may be fixed to the inner surface of the third side edge portion 250.

The second ball module 500b is configured to include a second case 510b.

The second case 510b may be configured to have the same form and structure as the case 510. A second circulation path 530b may be formed in the second case 510b, and the second circulation path 530b may be configured to have the form and structure as the circulation path 530. The second case 510b may be fixed to the outer surface of the second side edge portion 220.

The second rail 600b may be configured to have the same form and structure as the rail 600. A second sliding groove 610b is formed in the second rail 600b. The second sliding groove 610b may be configured to have the same form and structure as the sliding groove 610.

The second sliding groove 610b may be formed on the inner surface of the second rail 600b, and the second rail 600b may be fixed to the inner surface of the fourth side edge portion 260.

The first circulation path 530a includes a first outer path 531a, a first inner path 532a, a first upper path 533a, and a first lower path 534a.

The first outer path 531a may be configured to have the same form and structure as the outer path 531, the first inner path 532a may be configured to have the same form and structure as the inner path 532, the first upper path 533a may be configured to have the same form and structure as the upper path 533, and the first lower path 534a may be configured to have the same form and structure as the lower path 534.

The second circulation path 530b includes a second outer path 531b, a second inner path 532b, a second upper path 533b, and a second lower path 534b.

The second outer path 531b may be configured to have the same form and structure as the outer path 531, the second inner path 532b may be configured to have the same form and structure as the inner path 532, the second upper path 533b may be configured to have the same form and structure as the upper path 533, and the second lower path 534b may be configured to have the same form and structure as the lower path 534.

The first case 510a is configured to include a first central case 511a, a first upper case 512a, and a first lower case 513.

The first central case 511a may be configured to have the same form and structure as the central case 511, the first upper case 512a may have the same form and structure as the upper case 512, and the first lower case 513a may have the same form and structure as the lower case 513.

A first upper guide protrusion 502a may be formed in the first upper case 512a. The first upper guide protrusion 502a is formed adjacent to a spot where the first upper path 533a ends, and configured to protrude on the outer surface of the first upper case 512a. The first upper guide protrusion 502a makes the first upper path 533a be stably formed, and the first moving ball 550a stably move in the first upper path 533a.

A first lower guide protrusion 503a may be formed in the first lower case 513a. The first lower guide protrusion 503a is formed adjacent to a spot where the first lower path 534a ends, and configured to protrude on the outer surface of the first lower case 513a. The first lower guide protrusion 503a makes the first lower path 534a be stably formed, and the first moving ball 550a stably move in the first lower path 534a.

The second case 510b is configured to include a second central case 511b, a second upper case 512b, and a second lower case 513b.

The second central case 511b may be configured to have the same form and structure as the central case 511, the second upper case 512b may have the same form and structure as the upper case 512, and the second lower case 513b may have the same form and structure as the lower case 513.

A second upper guide protrusion 502b may be formed in the second upper case 512b. The second upper guide protrusion 502b is formed adjacent to a spot where the second upper path 533b ends, and configured to protrude on the outer surface of the second upper case 512b. The second upper guide protrusion 502b makes the second upper path 533b be stably formed, and the second moving ball 550b stably move in the second upper path 533b.

A second lower guide protrusion 503b may be formed in the second lower case 513b. The second lower guide protrusion 503b is formed adjacent to a spot where the second lower path 534b ends, and configured to protrude on the outer surface of the second lower case 513b. The second lower guide protrusion 503b makes the second lower path 534b be stably formed, and the second moving ball 550b stably move in the second lower path 534b.

The first case 510a may be divided into a first central case 511a, a first upper case 512a, and a first lower case 513a, and may be coupled to each other by using a fastening bolt FB2. Further, the second case 510b may be divided into a second central case 511b, a second upper case 512b, and a second lower case 513b, and may be coupled to each other by using a fastening bolt FB3. By such a configuration, the first moving ball 550a may be easily accommodated in the first circulation path 530a of the first case 510a, and the second moving ball 550b may be easily accommodated in the second circulation path 530b of the second case 510b.

A first coupling portion 211 and a second coupling portion 221 may be formed in the first body 200a.

The first coupling portion 211 is a portion to which the first case 510a is coupled and the second coupling portion 221 is a portion to which the second case 510b is coupled.

The first coupling portion 211 and the second coupling portion 221 may be coupled to the end portion of the first body 200a at a side far from the first edge portion 205. In addition, the first coupling portion 211 ma be formed at the first side edge portion 210 and the second coupling portion 221 may be formed at the second side edge portion 220.

The first coupling portion 211 may be formed at an end (end portion) of the first side edge portion 210 and the second coupling portion 221 may be formed an end (end portion) of the second side edge portion 220, based on the first direction X.

The first coupling portion 211 may be configured in a concave groove form on the outer surface of the end portion of the first side edge portion 210 and the second coupling portion 221 may be configured in the concave groove form on the outer surface of the end portion of the second side edge portion 220.

A first fitting protrusion 515a may be formed in the first case 510a. The first fitting protrusion 515a may protrude in a direction parallel to the second direction and protrude toward the center of the flexible display device 1.

Two or more first fitting protrusions 515a may be provided.

A first fitting groove 212 may be formed in the first coupling portion 211. The first fitting groove 212 corresponds to the first fitting protrusion 515a, and is configured in the concave groove form so that the first fitting protrusion 515a is fitted exactly.

A first fastening hole 157a may be formed in the first case 510a, a first side fastening hole 213 may be formed in the first body 200a, and the flexible display device 1 may be configured to include a first fastening pin 214.

The first fastening hole 517a may be configured in a hole form penetrating the first case 510a. The first fastening hole 517a may be configured in a screw hole form, and provided in a plural number.

The first fastening hole 517a is formed in a direction parallel to the third direction.

The first side fastening hole 213 may be configured in a hole form penetrating the first side edge portion 210 in the third direction at a portion where the first coupling portion 211 is formed. The first side fastening hole 213 may be provided in the plural number.

The first fastening pin 214 may be configured in a form such as a screw bolt.

While the first case 510a is seated on the first coupling portion 211 so that the first fitting protrusion 515a is inserted into the first fitting groove 212, the first fastening pin 214 is inserted and fastened into the first fastening hole 517a and the first side fastening hole 213.

By such a configuration, the first case 510a is very firmly fixed to the first side edge portion 210.

A second fitting protrusion 515b may be formed in the second case 510b. The second fitting protrusion 515b may protrude in the direction parallel to the second direction and protrude toward the center of the flexible display device 1.

Two or more second fitting protrusions 515b may be provided.

A second fitting groove 222 may be formed in the second coupling portion 221. The second fitting groove 222 corresponds to the second fitting protrusion 515b, and is configured in the concave groove form so that the second fitting protrusion 515b is fitted exactly.

A second fastening hole 517b may be formed in the second case 510b, a second side fastening hole 223 may be formed in the first body 200a, and the flexible display device 1 may be configured to include a second fastening pin 224.

The second fastening hole 517b may be configured in the hole form penetrating the second case 510b. The second fastening hole 517b may be configured in the screw hole form, and provided in the plural number.

The second fastening hole 517b is formed in the direction parallel to the third direction.

The second side fastening hole 223 may be configured in the hole form penetrating the second side edge portion 220 in the third direction at a portion where the second coupling portion 221 is formed. The second side fastening hole 223 may be provided in the plural number.

The second fastening pin 224 may be configured in the form such as the screw bolt.

While the second case 510b is seated on the second coupling portion 211 so that the second fitting protrusion 515b is inserted into the second fitting groove 222, the second fastening pin 224 is inserted and fastened into the second fastening hole 517b and the second side fastening hole 223.

By such a configuration, the second case 510b is very firmly fixed to the second side edge portion 220.

A third fitting protrusion 620a may be formed in the first rail 600a. The third fitting protrusion 620a may protrude in the direction parallel to the second direction and protrude toward the inner surface of the third side edge portion 250.

Two or more third fitting protrusions 620a may be provided.

A third fitting groove 255 may be formed on the inner surface of the third side edge portion 250. The third fitting groove 255 corresponds to the third fitting protrusion 620a, and is configured in the concave groove form so that the third fitting protrusion 620a is fitted exactly.

A fourth fitting protrusion 620b may be formed in the second rail 600b. The fourth fitting protrusion 620b may protrude in the direction parallel to the second direction and protrude toward the inner surface of the fourth side edge portion 260.

Two or more fourth fitting protrusions 620b may be provided.

A fourth fitting groove 265 may be formed on the inner surface of the fourth side edge portion 260. The fourth fitting groove 265 corresponds to the fourth fitting protrusion 620b, and is configured in the concave groove form so that the fourth fitting protrusion 620b is fitted exactly.

In the flexible display device 1, the first body 200a and the second body 200b are connected by mediating the first moving ball 550a and the second moving ball 550b. Even when the first body 200a and the second body 200b move relatively to each other, the first moving ball 550a and the second moving ball 550b mediate the connection of the first body 200a and the second body 200b.

Therefore, a load applied from the first body 200a may be delivered to the second body 200b via the first moving ball 550a and the second moving ball 550b, and a load applied from the second body 200b may be delivered to the first body 200a via the first moving ball 550a and the second moving ball 550b.

Even when the first body 200a and the second body 200b move relatively to each other, the first moving ball 550a and the second moving ball 550b roll and move, and slip of the first moving ball 550a and the second moving ball 550b may be prevented, and the generation of the frictional force (kinetic frictional force) may be minimized.

As described above, in the flexible display device 1, while the first side edge portion 210 and the second side edge portion 220 are positioned between the third side edge portion 250 and the fourth side edge portion 260, the first case 510a forming the first ball module 500a is fixed to the outer surface of the first side edge portion 210, and the first rail 600a is fixed to the inner surface of the third side edge portion 250, and the second case 510b forming the second ball module 500b is fixed to the outer surface of the second side edge portion 220 and the second rail 600b is fixed to the inner surface of the fourth side edge portion 260. As a result, when the second body 200b moves between the first position and the second position, the first ball module 500a, the first rail 600a, the second ball module 500b, and the second rail 600b may be prevented from being exposed to the outside, and foreign substances may be prevented from invading the first ball module 500a and the second ball module 500b.

Further, the first ball module 500a and the second ball module 500b prevents movement in a direction other than the first direction X (or an opposite direction to the first direction X) of the second body 200b relatively to the first body 200a while guiding movement in a direction other than the first direction X (or an opposite direction to the first direction X) of the second body 200b relatively to the first body 200a, and as a result, the second body 200b relatively to the first body 200a may not be tilted, but moved in an unintended direction, and unintended deformation of the flexible display 300 may be prevented.

Each of the sliding groove 610, the first sliding groove 610a, and the second sliding groove 610b is configured in the concave groove form.

As a result, the first upper guide protrusion 502a and the first lower guide protrusion 503a may in the longitudinal direction of the first sliding groove 610a without contacting the first sliding groove 601a. In addition, the second upper guide protrusion 502b and the second lower guide protrusion 503a may in the longitudinal direction of the first sliding groove 610a without contacting the first sliding groove 601a.

Each of the sliding groove 610, the first sliding groove 610a, and the second sliding groove 610b may be divided into a first contact portion 611, a second contact portion 612, and a non-contact portion 613.

The first contact portion 611 and the second contact portion 612 are configured in a concave curve form, and contact the moving ball 550 (or the first moving ball 550*a* or the second moving ball 550*b*).

The non-contact portion 613 is formed between the first contact portion 611 and the second contact portion 612. The non-contact portion 611 is configured in a further concave groove form in the sliding groove 610 (or the first sliding groove 610*a* or the second sliding groove 610*b*), and spaced apart from the moving ball 550 (or the first moving ball 550*a* or the second moving ball 550*b*).

The first contact portion 611 and the second contact portion 612 may be symmetric to each other based on the non-contact portion 613.

By such a configuration, the moving ball 550 may be in two point-contact with the sliding groove 610 (or the first sliding groove 610*a* or the second sliding groove 610*b*), slip which occurs between the moving ball 550 and the sliding groove 610 (or the first sliding groove 610*a* or the second sliding groove 610*b*) may be minimized while preventing the moving ball 550 from being separated from the sliding groove 610 (or the first sliding groove 610*a* or the second sliding groove 610*b*).

In addition, the non-contact portion 613 is provided in each of the first sliding groove 610*a* and the second sliding groove 610*b*, and as a result, interference (contact) between the first upper guide protrusion 502*a* and the first lower guide protrusion 503*a*, and the first sliding groove 610*a* may be further prevented, and interference between the second upper guide protrusion 502*b* and the second lower guide protrusion 503*b*, and the second sliding groove 610*b* may be further prevented.

Figure 17A:
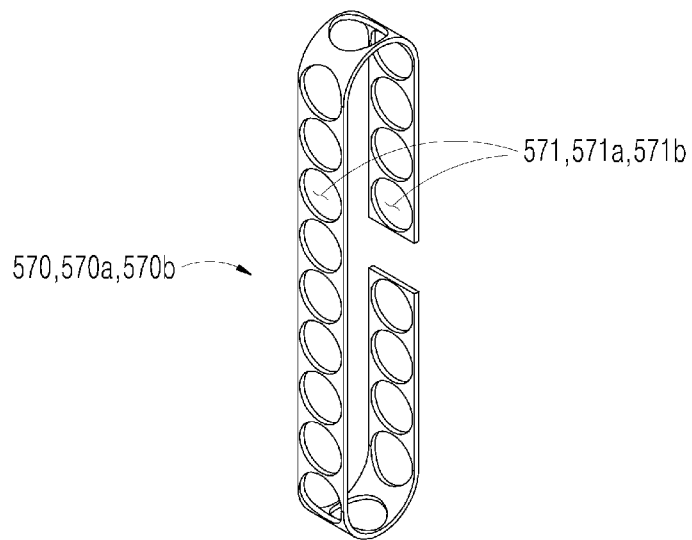
FIG. 17a is a perspective view illustrating a retainer according to an embodiment.
Figure 17B:
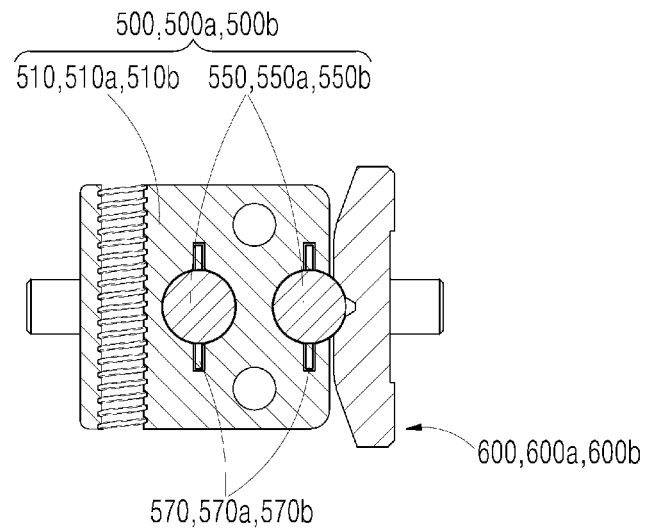
FIG. 17b is a cross-sectional view illustrating a ball module and a rail to which the retainer is coupled.
Figure 17C:
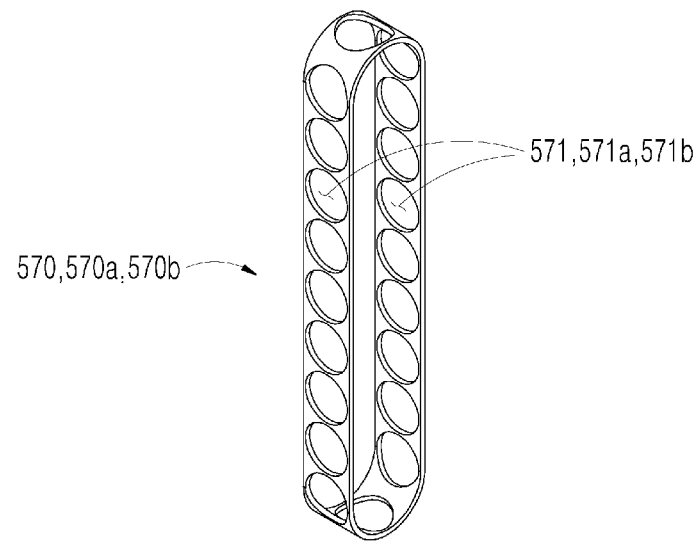

FIG. 17*a* is a perspective view illustrating a retainer 570 according to an embodiment, FIG. 17*b* is a cross-sectional view illustrating a ball module 500 and a rail 600 to which the retainer 570 is coupled, and FIG. 17*c* is a perspective view illustrating a retainer 570 according to a different embodiment from FIG. 16*a*.

The ball module 500 may be configured to include the retainer 570.

The first ball module 500*a* may be configured to further include a first retainer 570*a* and the second ball module 500*b* may be configured to further include a second retainer 570*b*.

A through hole 671 to which each moving ball 550 is fitted is repeatedly formed in the retainer 570. The retainer 570 is inserted into the circulation path 530, and flexibly bent to rotate along the circulation path 530.

A through hole 571*a* to which each first moving ball 550*a* is fitted is repeatedly formed in the first retainer 570*a*. The first retainer 570*a* is inserted into the first circulation path 530*a*, and flexibly bent to rotate along the first circulation path 530*a*.

A second through hole 571*b* to which each second moving ball 550*b* is fitted is repeatedly formed in the second retainer 570*b*. The second retainer 570*b* is inserted into the second circulation path 530*b*, and flexibly bent to rotate along the second circulation path 530*b*.

Each of the retainer 570, the first retainer 570*a*, and the second retainer 570*b* may be made of a plastic material (e.g., a plastic film material) which is flexibly bent, and or made of rubber.

The retainer 570 (or the first retainer 570*a* or the second retainer 570*b*) may be configured in a ring form in which both end portions are connected (see FIG. 17*c*) or configured in a form in which both end portions are disconnected (see FIG. 17*a*).

The flexible display device 1 is configured to include the retainer 570 (or the first retainer 570*a* or the second retainer 570*b*), and as a result, each moving ball 550 (or the first moving ball 550*a* or the second moving ball 550*b*) may stably move and roll along the circulation path 530 (or the first circulation path 530*a* or the second circulation path 530*b*), and each moving ball 550 (or the first moving ball 550*a* or the second moving ball 550*b*) may be prevented from being separated from the case 510 (or the first case 510*a* or the second case 510*b*).

Meanwhile, grease may be applied to the circulation path 530 (or the first circulate path 530*a* or the second circulation path 530*b*), and as a result, the moving ball 550 (or the first moving ball 550*a* or the second moving ball 550*b*) may more easily roll and move inside the circulation path 530 (or the first circulation path 530*a* or the second circulation path 530*b*), and friction generated upon the movement of the moving ball 550 (or the first moving ball 550*a* or the second moving ball 550*b*) may be remarkably reduced.

Figure 18A:
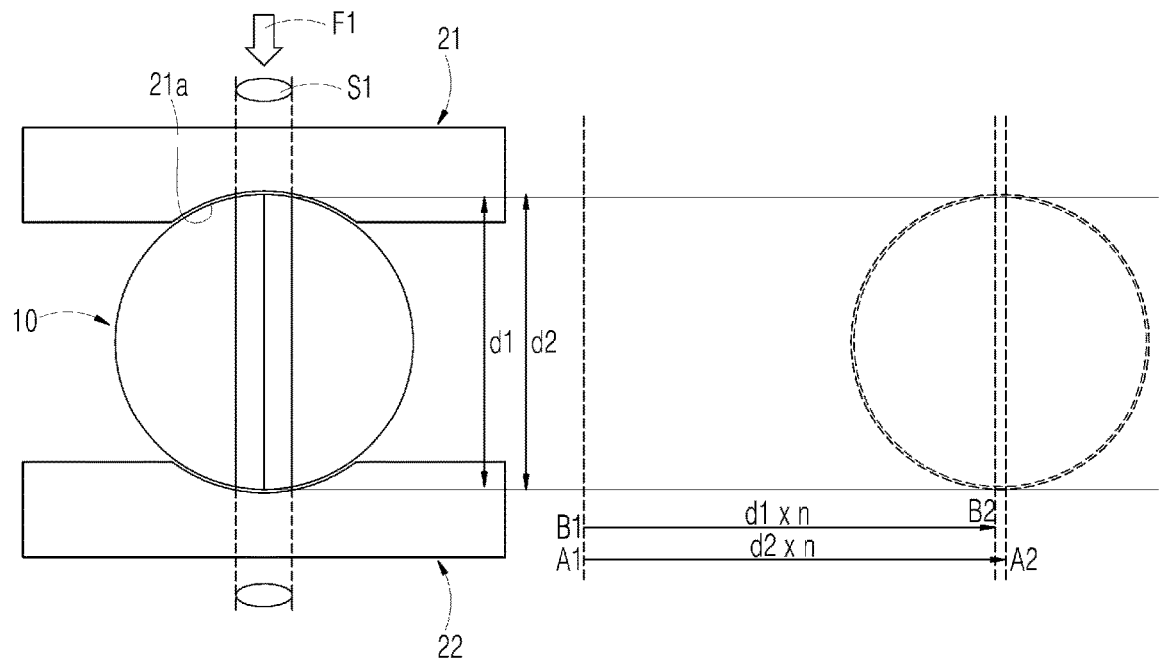
FIGS. 18a and 18b as reference diagrams for describing a curvature and a size of a sliding groove (or a first sliding groove or a second sliding groove) illustrate a pair of rails in which a transverse cross-section is constant in a longitudinal direction and a ball interposed between a pair of rails.
Figure 18B:
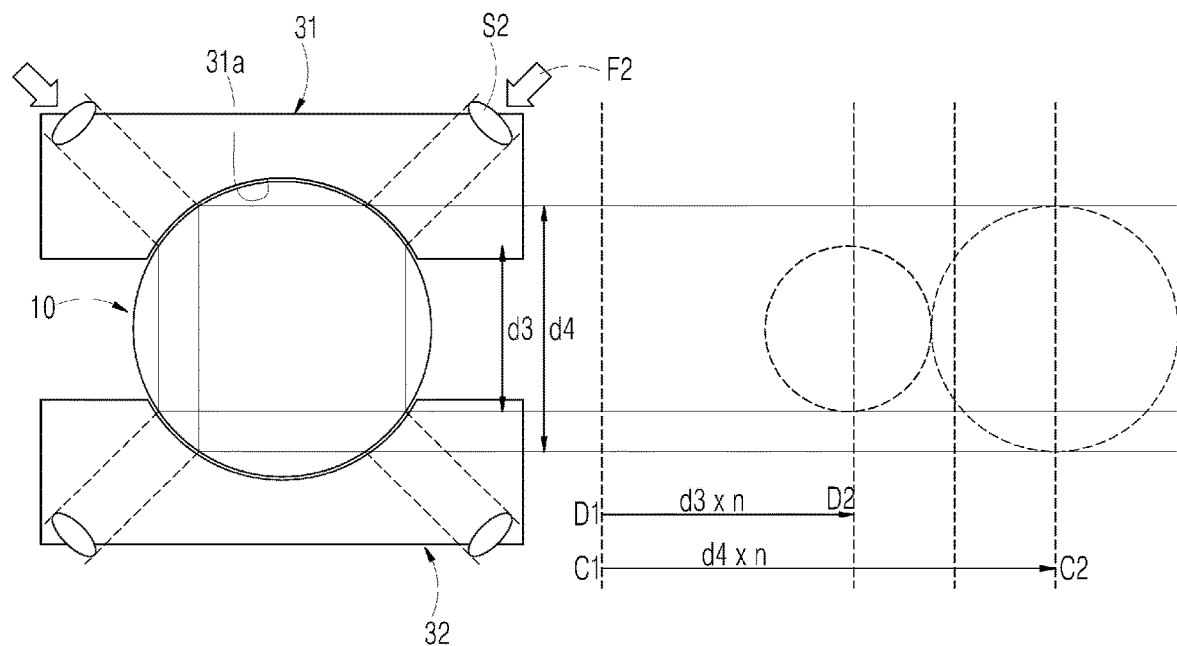

FIGS. 18*a* and 18*b* as reference diagrams for describing a curvature and a size of a sliding groove 610 (or a first sliding groove 610*a* or a second sliding groove 610*b*) illustrate a pair of rails in which a transverse cross-section is constant in a longitudinal direction and a ball interposed between a pair of rails. A pair of rails are illustrated in a section form.

As illustrated in FIG. 18*a*, it may be assumed that a load F1 is applied while an inner curve surface 21*a* (first inner curve surface) of a pair of rails 21 and 22, and the ball 10 contact each other in a predetermined contact spot S1 (first contact spot).

When the ball 10 rolls between a pair of rails 21 and 22, the first contact spot S1 forms a circle around the ball 10, and a minimum diameter of the circle becomes d1 and a maximum diameter becomes d2.

When the ball 10 moves the longitudinal direction of the rails 21 and 22, if the circle having the maximum diameter d2 moves without the slip with the rails 21 and 31 (e.g., rolls and moves n times), the movement distance becomes a length from A1 to A2, and if the circle having the minimum diameter d1 moves without the slip with the rails 21 and 22 (e.g., rolls and moves n times), the movement distance becomes a length from B1 to B2.

Therefore, in this case, with a range as large as a difference between the length from A1 to A2 and the length from B1 to B2, the slip of the ball 10 substantially occurs.

As illustrated in FIG. 18*b*, it may be assumed that while an inner curve surface 31*a* (second inner curve surface) of a pair of rails 31 and 32 is configured to be larger than the first inner curve surface 21*a*, a load F2 is applied while the inner curve surface 31*a* and the first inner curve surface 21*a* contact each other in a predetermined contact spot S2 (second contact spot).

When the ball 10 rolls between a pair of rails 31 and 32, the second contact spot S2 forms the circle around the ball 10, and the minimum diameter of the circle becomes d3 and the maximum diameter becomes d4.

When the ball 10 moves the longitudinal direction of the rails 31 and 32, if the circle having the maximum diameter d4 moves without the slip with the rails 31 and 32 (e.g., rolls and moves n times), the movement distance becomes a length from C1 to C2, and if the circle having the minimum diameter d3 moves without the slip with the rails 31 and 32 (e.g., rolls and moves n times), the movement distance becomes a length from D1 to D2.

Therefore, in this case, the slip of the ball 10 substantially occurs as large as a difference between the length from A1 to A2 and the length from B1 to B2.

When widths of the first contact spot S1 and the second contact spot S2 are equal to each other, the difference between the length from C1 to C2 and the length from D1 to D2 is larger than a difference between the difference between the length from A1 to A2 and the length from B1 to B2, so the slip in the case of FIG. 18b may occurs more than in the case of FIG. 18a, and the slip in the case of FIG. 18a may occurs less than in the case of FIG. 18b.

By considering such a point, in the flexible display device 1 according to the embodiment, a curvature of the sliding groove 610 (or the first sliding groove 610a or the second sliding groove 610b) is equal to a curvature of the moving ball 550 (or the first moving ball 550a or the second moving ball 550b), and a length an arc formed by the sliding groove 610 (or the first sliding groove 610a or the second sliding groove 610b) is configured as 50 to 55% of the diameter of the moving ball 550 (or the first moving ball 550a or the second moving ball 550b).

In an embodiment, the length of the arc formed by the sliding groove 610 (or the first sliding groove 610a or the second sliding groove 610b) is configured as 52% of the diameter of the moving ball 550 (or the first moving ball 550a or the second moving ball 550b).

Hereinabove, a specific embodiment of the present disclosure is described and illustrated, but the present disclosure is not limited to the disclosed embodiment, and it may be appreciated by those skilled in the art that the embodiment can be variously modified and transformed to another specific embodiment without departing from the spirit and the scope of the present disclosure. Therefore, the scope of the present disclosure will not be defined by the described embodiment, but defined by the technical spirit disclosed in the claims.

INDUSTRIAL APPLICABILITY

A flexible display device according to the embodiment of the present disclosure may include a ball module and a rail that mediating sliding movement of a first body and a second body, and slip and friction may be minimized between the ball module and the rail, and as a result, an industrial applicability is remarkable in that a soft operation (deformation) of the flexible display device and stable deformation of a flexible display can be stably achieved.

The invention claimed is:

1. A flexible display device comprising:
a first body;
a second body configured to move parallel to a first direction relatively to the first body;
a flexible display including a first region forming a surface parallel to the first direction and fixed to the first body, and a second region extending from the first region and configured to be curved, wherein a portion of the second region that is coplanar with the first region changes as the second body moves with respect to the first body;
a case fixed to the first body and having a circulation path which is a circulating passage formed in the case;
a rail fixed to the second body and having a sliding groove parallel to the first direction; and
a plurality of moving balls having a ball shape, which is inserted into the circulation path and arranged to be movable along the circulation path,
wherein some of the plurality of moving balls contact the sliding groove.

2. The flexible display device of claim 1, wherein the case and the plurality of moving balls are combined with each other and constitute a ball module, and the rail and the ball module are provided at both sides of the flexible display device, respectively.

3. The flexible display device of claim 1, wherein the circulation path includes
an outer path opened outward in the first direction and facing the sliding groove,
an inner path parallel to the outer path and formed inside the case,
an upper path of a curve form, which connects the outer path and the inner path, and
a lower path of the curve form, which connects the outer path and the inner path at an opposite side to the upper path.

4. The flexible display device of claim 3, wherein a length of each of the outer path and the inner path is configured to be 3 to 10 times of a diameter of the moving ball, and
a width between the center of the outer path and the center of the inner path is configured to be 1 to 2 times of the diameter of the moving ball.

5. The flexible display device of claim 3, wherein the case includes
a central case in which the outer path and the inner path are formed,
an upper case having the upper path, and detachably coupled to the central case, and
a lower case having the lower path, and detachably coupled to the central case.

6. The flexible display device of claim 1, further comprising:
a retainer having first through holes to through which the moving balls are fitted, respectively, which are repeatedly formed, and inserted into the circulation path and flexibly bent to rotate along the circulation path.

7. The flexible display device of claim 1, wherein grease is applied to the circulation path.

8. The flexible display device of claim 1, wherein the sliding groove includes
a first contact portion and a second contact portion configured in a concave curve form, and contacting the moving ball, and
a non-contact portion configured in the concave groove form between the first contact portion and the second contact portion, and spaced apart from the moving ball.

9. The flexible display device of claim 1, wherein a curvature of the sliding groove is equal to a curvature of the moving ball, and
a length of an arc formed by the sliding groove is configured as 50 to 55% of a diameter of the moving ball.

10. The flexible display device of claim 1, wherein the second body is configured to further include a support formed in a second direction orthogonal to the first direction,
the second body is configured to move between a first position and a second position relatively to the first body,
the second region includes a first connected region extended from the first region and a second connected region extended from the first connected region,
when the second body is in the first position, the first connected region is curved while forming a curved surface around the support, and the second connected region is parallel to the first region, and
when the second body is in the second position, the first connected region forms the same plane as the first region, and a part of the second connected region is curved while forming the curved surface around the support.

11. The flexible display device of claim 10, wherein the support is configured to be rotatable around a rotational axis of the second direction.

12. The flexible display device of claim 10, wherein the case is fixed to an end portion of the first body close to the support based on the first direction.

13. A flexible display device comprising:
a first body including a first side edge portion and a second side edge portion parallel to a first direction;
a second body including a third side edge portion facing the first side edge portion and a fourth side edge portion facing the second side edge portion, and configured to reciprocate in the first direction relatively to the first body;
a flexible display including a first region forming a surface parallel to the first direction and fixed to the first body, and a second region extending from the first region and configured to be curved, wherein a portion of the second region that is coplanar with the first region changes as the second body moves with respect to the first body;
a first ball module including a plurality of first moving balls having a ball shape, which are arranged to be movable along a first circulation path which is a passage form circulated between the first side edge portion and the third side edge portion; and
a second ball module including a plurality of second moving balls having the ball shape, which are arranged to be movable along a second circulation path which is the passage form circulated between the third side edge portion and the fourth side edge portion,
wherein the first body and the second body are connected by mediating the first moving ball and the second moving ball.

14. The flexible display device of claim 13, wherein the third side edge portion is positioned at an outer side of the first side edge portion and the fourth side edge portion is positioned at an outer side of the second side edge portion, and
the flexible display device includes
a first case having the first circulation path and fixed to an outer surface of the first side edge portion,
a first rail having a first sliding groove configured in a concave groove form in the inner surface of the first rail along the first direction and contacting a plurality of first moving balls, and fixed to an inner surface of the third side edge portion,
a second case having the second circulation path and fixed to an outer surface of the second side edge portion, and
a second rail having a second sliding groove configured in a concave groove form in the inner surface of the second rail along the first direction and contacting a plurality of second moving balls, and fixed to an inner surface of the fourth side edge portion.

15. The flexible display device of claim 13, wherein the first side edge portion and the second side edge portion are positioned between the third side edge portion and the fourth side edge portion.

16. The flexible display device of claim 14, wherein the first circulation path includes
a first outer path which is formed in the first direction and opened toward the first sliding groove, and has a length being 3 to 10 times of a diameter of the first moving ball,
a first inner path parallel to the first outer path and having the same length as the first outer path, and formed inside the first case,
a first upper path of a curve form, which connects the first outer path and the first inner path, and
a first lower path of the curve form, which connects the first outer path and the first inner path at an opposite side to the first upper path, and
the second circulation path includes
a second outer path which is formed in the first direction and opened toward the second sliding groove, and has a length being 3 to 10 times of a diameter of the second moving ball,
a second inner path parallel to the second outer path and having the same length as the second outer path, and formed inside the second case,
a second upper path of the curve form, which connects the second outer path and the second inner path, and
a second lower path of the curve form, which connects the second outer path and the second inner path at an opposite side to the second upper path, and
a width between the center of the first outer path and the center of the first inner path is configured to be 1 to 2 times of the diameter of the first moving ball, and
a width between the center of the second outer path and the center of the second inner path is configured to be 1 to 2 times of the diameter of the second moving ball.

17. The flexible display device of claim 16, wherein the first case includes
a first central case having the first outer path and the first inner path,
a first upper case having the first upper path and detachably coupled to the first central case, and
a first lower case having the first lower path and detachably coupled to the first central case, and
the second case includes
a second central case having the second outer path and the second inner path,
a second upper case having the second upper path and detachably coupled to the second central case, and
a second lower case having the second lower path and detachably coupled to the second central case.

18. The flexible display device of claim 13, wherein the first ball module further includes a first retainer having first through holes to which each of the first moving ball is fitted are repeatedly formed in the first retainer and inserted into the first circulation path, and flexibly bent to rotate along the first circulation path, and
the second ball module further includes a second retainer having second through holes to which each of the second moving ball is fitted are repeatedly formed in the second retainer and inserted into the second circulation path, and flexibly bent to rotate along the second circulation path.

19. The flexible display device of claim 13, wherein the flexible display device includes
a plurality of support bars configured to be long in a direction parallel to a second direction which is a direction toward the fourth side edge portion from the third side edge portion, and fixed to the inner surface of the second region, and
the support bar includes
a first support slider forming one end portion,
a second support slider forming an end portion at an opposite side to the first support slider, and
a connection arm connecting the first support slider and the second support slider, and supporting the second region, and the second body includes
a first movement guide groove configured by a U-shaped groove and forming a path into which the first support slider is inserted and moved, and
a second movement guide groove configured by the U-shaped groove and forming a path into which the second support slider is inserted and moved.

20. The flexible display device of claim 19, further comprising:
an inner plate configured by a metallic plate which is elastic and bent, and coupled to the inner surface of the second region,
wherein the support bar is fixed to the inner surface of the inner plate.

* * * * *